(12) United States Patent
Fein et al.

(10) Patent No.: US 7,636,764 B1
(45) Date of Patent: Dec. 22, 2009

(54) CLOUD RESOURCE USAGE IN DATA FORWARDING STORAGE

(76) Inventors: Gene Fein, 29712 Zuma Bay Way, Malibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

(21) Appl. No.: 12/397,261

(22) Filed: Mar. 3, 2009

Related U.S. Application Data

(63) Continuation of application No. 12/240,757, filed on Sep. 29, 2008.

(51) Int. Cl.
  *G06F 15/167* (2006.01)
  *G06F 15/16* (2006.01)
(52) U.S. Cl. .................. 709/212; 709/201; 709/213
(58) Field of Classification Search ............... 709/201, 709/212, 213
  See application file for complete search history.

(56) References Cited

U.S. PATENT DOCUMENTS

| | | | | |
|---|---|---|---|---|
| 5,978,839 A * | 11/1999 | Okuhara et al. | ............ | 709/215 |
| 6,549,957 B1 * | 4/2003 | Hanson et al. | ................. | 710/5 |
| 6,721,275 B1 * | 4/2004 | Rodeheffer et al. | ......... | 370/238 |
| 6,985,476 B1 * | 1/2006 | Elliott et al. | ................ | 370/349 |
| 7,035,933 B2 * | 4/2006 | O'Neal et al. | ............... | 709/233 |
| 7,120,631 B1 | 10/2006 | Vahalia et al. | ................. | 707/8 |
| 7,191,298 B2 | 3/2007 | Kaminsky et al. | ........... | 711/162 |
| 7,327,731 B1 | 2/2008 | Kumar et al. | ................ | 370/390 |
| 7,428,540 B1 | 9/2008 | Coates et al. | ............... | 707/200 |
| 2003/0137880 A1 * | 7/2003 | Barrenscheen et al. | . | 365/189.05 |
| 2005/0010685 A1 * | 1/2005 | Ramnath et al. | ............ | 709/238 |
| 2006/0212551 A1 * | 9/2006 | Kao et al. | .................... | 709/220 |
| 2006/0242212 A1 | 10/2006 | Brinkmann et al. | ......... | 711/148 |
| 2007/0266220 A1 * | 11/2007 | Nelson | ........................ | 711/170 |
| 2008/0114891 A1 * | 5/2008 | Pereira | ....................... | 709/231 |
| 2009/0141621 A1 * | 6/2009 | Fan et al. | .................... | 370/223 |

OTHER PUBLICATIONS

Response to Office Action filed Jun. 11, 2009 for U.S. Appl. No. 12/241,003.
Response to Office Action filed Jun. 12, 2009 for U.S. Appl. No. 12/170,901.
Response to Office Action filed Jun. 12, 2009 for U.S. Appl. No. 12/170,925.

* cited by examiner

*Primary Examiner*—Kenny S Lin
(74) *Attorney, Agent, or Firm*—Chinh H. Pham; Greenberg Traurig, LLP

(57) ABSTRACT

Methods and apparatus, including computer program products, for data forwarding storage. A network includes a group of interconnected computer system nodes, the group including at least one central server, wherein the at least one central server communicates with a cloud resource and controls support of the group of nodes using the cloud resource; and each node of the group of interconnected computer system nodes receives data and continuously forwards the data from node memory to node memory without storing on any physical storage device.

20 Claims, 18 Drawing Sheets

CLOUD RESOURCE USAGE IN DATA FORWARDING STORAGE

RELATED APPLICATIONS

This application is a continuation of U.S. application Ser. No. 12/240,757, filed Sep. 29, 2008, titled "Cloud Resource Usage in Data Forwarding Storage," herein incorporated by reference in its entirety. The present patent application is related to the following applications and each is herein incorporated by reference in its entirety: U.S. application Ser. No. 12/046,757, filed Mar. 12, 2008, titled "Data Forwarding Storage"; U.S. application Ser. No. 12/052,345, filed Mar. 20, 2008, titled "Redundant Data Forwarding Storage"; U.S. application Ser. No. 12/132,804, filed Jun. 4, 2008, titled "Redundant Data Forwarding Storage"; U.S. application Ser. No. 12/099,498, filed Apr. 8, 2008, titled "Data File Forwarding Storage and Search"; U.S. application Ser. No. 12/109,458, filed Apr. 25, 2008, titled "Real-Time Communications Over Data Forwarding Framework"; U.S. application Ser. No. 12/329,253, filed Dec. 5, 2008, titled "Real-Time Communications Over Data Forwarding Framework"; U.S. application Ser. No. 12/116,610, filed May 7, 2008, titled "Deletion in Data File Forwarding Framework"; U.S. application Ser. No. 12/329,282, filed Dec. 5, 2008, titled "Deletion in Data File Forwarding Framework"; U.S. application Ser. No. 12/170,901, filed Jul. 10, 2008, titled "Media Delivery in Data Forwarding Storage Network"; U.S. application Ser. No. 12/170,925, filed Jul. 10, 2008, titled "Advertisement Forwarding Storage and Retrieval Network"; U.S. application Ser. No. 12/184,866, filed Aug. 1, 2008, titled "Multi-Homed Data Forwarding Storage"; U.S. application Ser. No. 12/240,951, filed on Sep. 29, 2008, titled "Rotating Encryption in Data Forwarding Storage"; U.S. application Ser. No. 12/241,032, filed on Sep. 29, 2008, titled "Mixed Network Architecture in Data Forwarding Storage"; U.S. application Ser. No. 12/241,003, filed on Sep. 29, 2008, titled "Disassembly/Reassembly in Data Forwarding Storage"; U.S. application Ser. No. 12/240,925, filed on Sep. 29, 2008, titled "Geolocation Assisted Data Forwarding Storage"; U.S. application Ser. No. 12/240,991, filed on Sep. 29, 2008, titled "Measurement in Data Forwarding Storage"; U.S. application Ser. No. 12/240,967, filed on Sep. 29, 2008, titled "Selective Data Forwarding Network"; U.S. application Ser. No. 12/240,885, filed on Sep. 29, 2008, titled "User Interface in Data Forwarding Network"; and U.S. application Ser. No. 12/390,161, filed on Feb. 20, 2009, titled "User Interface in Data Forwarding Network".

BACKGROUND

At least some embodiments disclosed herein relate to data storage, and more particularly, to the usage of a cloud resource with data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for data forwarding storage.

In general, in one aspect, the invention features, a method comprising, in a network of interconnected computer system nodes comprising at least one central server, wherein the at least one central server is configured to communicate with a cloud resource, receiving a request from a source system to store data; directing the data to a node memory; continuously forwarding the data from one node memory to another node memory in the network of interconnected computer system nodes without storing on any physical storage device in the network; and supporting, under control of the at least one central server, the network of interconnected computer system nodes using the cloud resource.

In another aspect, the invention features a network comprising a group of interconnected computer system nodes, the group comprising at least one central server, wherein the at least one central server is configured to communicate with a cloud resource and to control support of the group of interconnected computer system nodes using the cloud resource; and each node of the group of interconnected computer system nodes is configured to receive data and continuously forward the data from node memory to node memory without storing on any physical storage device in response to a request to store data from a requesting system and retrieve data being continuously forwarded from node memory to node memory in response to a request to retrieve data from the requesting system.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

As used herein, "cloud resource" means a resource that combines the computational power of a large grouping of processors and/or that combines the storage capacity of a large grouping of computer memories. For example, systems that provide a cloud resource may be utilized exclusively by their owners, such as Google or Yahoo; or such systems may be accessible to outside users who deploy applications within the supercomputing infrastructure to obtain the benefit of large computational or storage resources.

As described below, the cloud resource may be enabled with the application logic of a data forwarding storage system to enable the computation of system queries with greater speed. In one embodiment, the cloud resource may be utilized for storage based upon an installed database program logic database application for the data forwarding storage system so that the database can hold system administration data such as passwords, usernames, indexes, scrambled data and the like.

Figure 1:
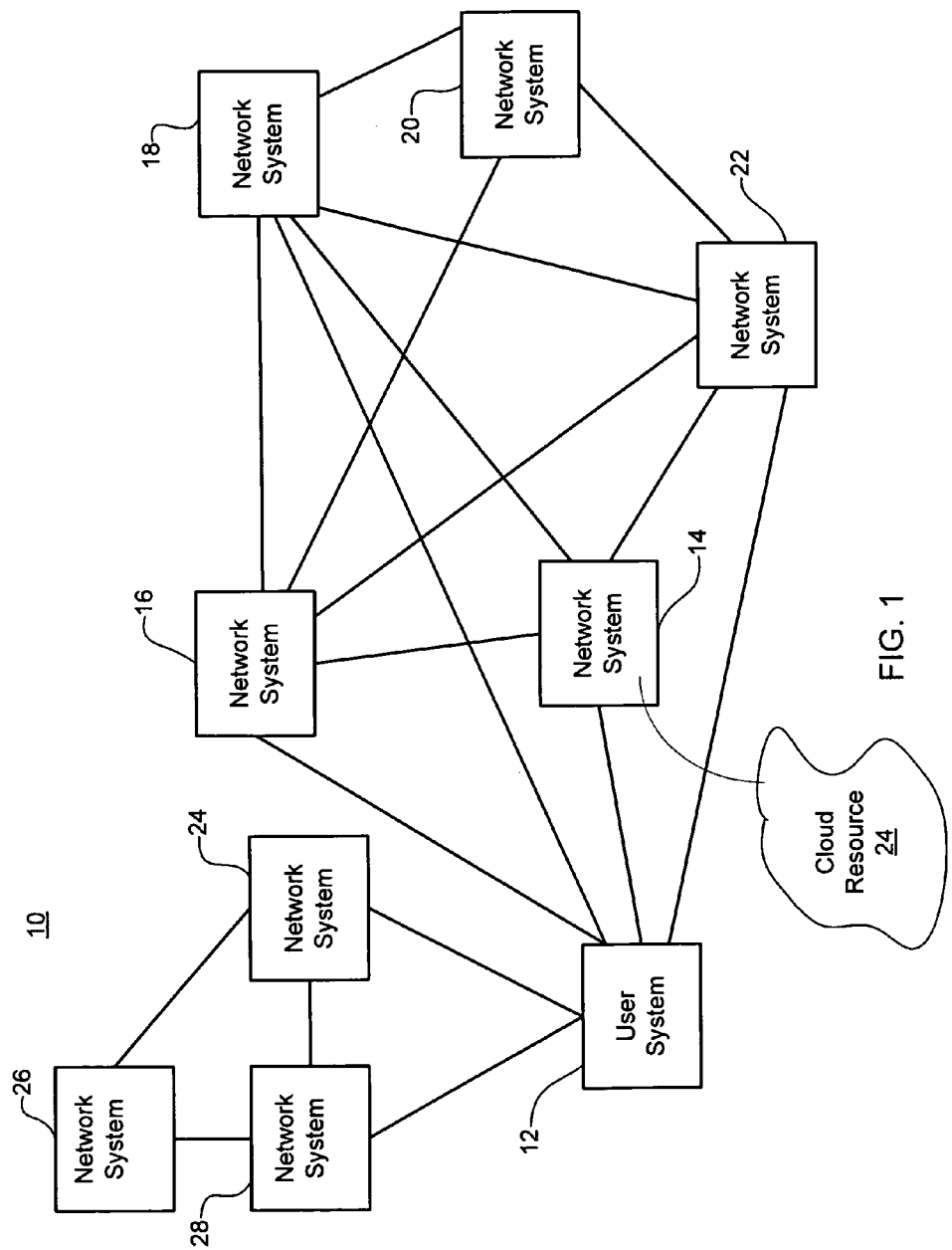
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

In one example, nodes 14, 16, 18, 20 and 22 are considered to be a private network. In a private network, an administrator controls the nodes and may designate which node is the central server. The network 10 can also include one or more additional nodes. For example, nodes 24, 26 and 28. These nodes 24, 26 and 28 are considered to be part of one or more public networks in which the administrator has little or no control.

Network 10 further includes a cloud resource 24 coupled to central server 14. Cloud resource 24 may be further coupled to other of network systems in network 10 that may have also been designated as a central server. Cloud resource 24 typically has a large number of nodes (private and/or public). For example, a cloud resource 24 may have millions of nodes each with its own internal IP address.

In one embodiment, various functions of central server 14, as discussed in more detail below, and/or functions of other central servers in network 10, may be off-loaded to cloud resource 24 to support central server 14. These functions generally include two types of sets: (i) a computational set of functions (e.g., determining system capacities, system functions, and load balancing); and (ii) a data storage set of functions (e.g., indexing, handling user lists, password lists, and encryption data, matching encryptions to different networks, and changing and validating encryptions). The data storage functions generally relate to the storing on cloud resource 24 of system administrative information (e.g., system information handled by central server 14) related to data being stored by forwarding storage in network 10. Support of central server 14 using cloud resource 24 is discussed in more detail below.

Additional examples of system administration data that may be stored in cloud resource 24 include the following: lists, scrambled word lists of image data, passwords, usernames, indexes, node activity and rules implementation.

In one embodiment, cloud resource 24 is used as a physical storage resource. In other embodiments, cloud resource 24 may be multi-homed and used for data storage as discussed in greater detail below. For example, system administration data may be stored in fixed storage on cloud resource 24, and node forward storage, as described herein, on cloud resource 24 may be used for user system data.

Central server 14 coordinates all communications to and from cloud resource 24. Central server 14 may use cloud resource 24 to more quickly determine central server functions such as, for example, traffic allotment/load balancing for the node states and table calculations; archiving; and other computational actions such as determining where to locate nodes and files within network 10. The archiving may include, for example, storage of indexes, user names, and passwords associated the execution of process 200 on central server 14. In this role, central server 14 acts as a middleware between the cloud and the user to process user queries (e.g., requests from user system 12 to store or retrieve data from network 10), communication of user data to and from network 10, and other central server system functions (e.g., load balancing, and system maintenance requirements).

In another embodiment, the nodes of cloud resource 24 may be used as a node state in conjunction with the network storage described below. This node state may be, for example, a private or public node state.

In another embodiment, cloud resource 24 may be used with the network storage described below for the acceleration of data delivery to user 42 within the system by the advanced storage of certain data in anticipation of a later demand or need by one or more of various users 42. The selection of such data may be based on various factors such as the popularity or likelihood of certain user requests based on historical observations. For example, video commercials or other advertisements, or financial data such as stock quotes and related data may be stored in cloud resource 24.

Usage of cloud resource 24 for such advanced storage often will permit more rapid delivery of the advance data in response to a request by user 42. Central server 14 coordinates the usage of cloud resource 24 for this advanced storage of data and controls delivery of the data in response to a user request.

Figure 2:
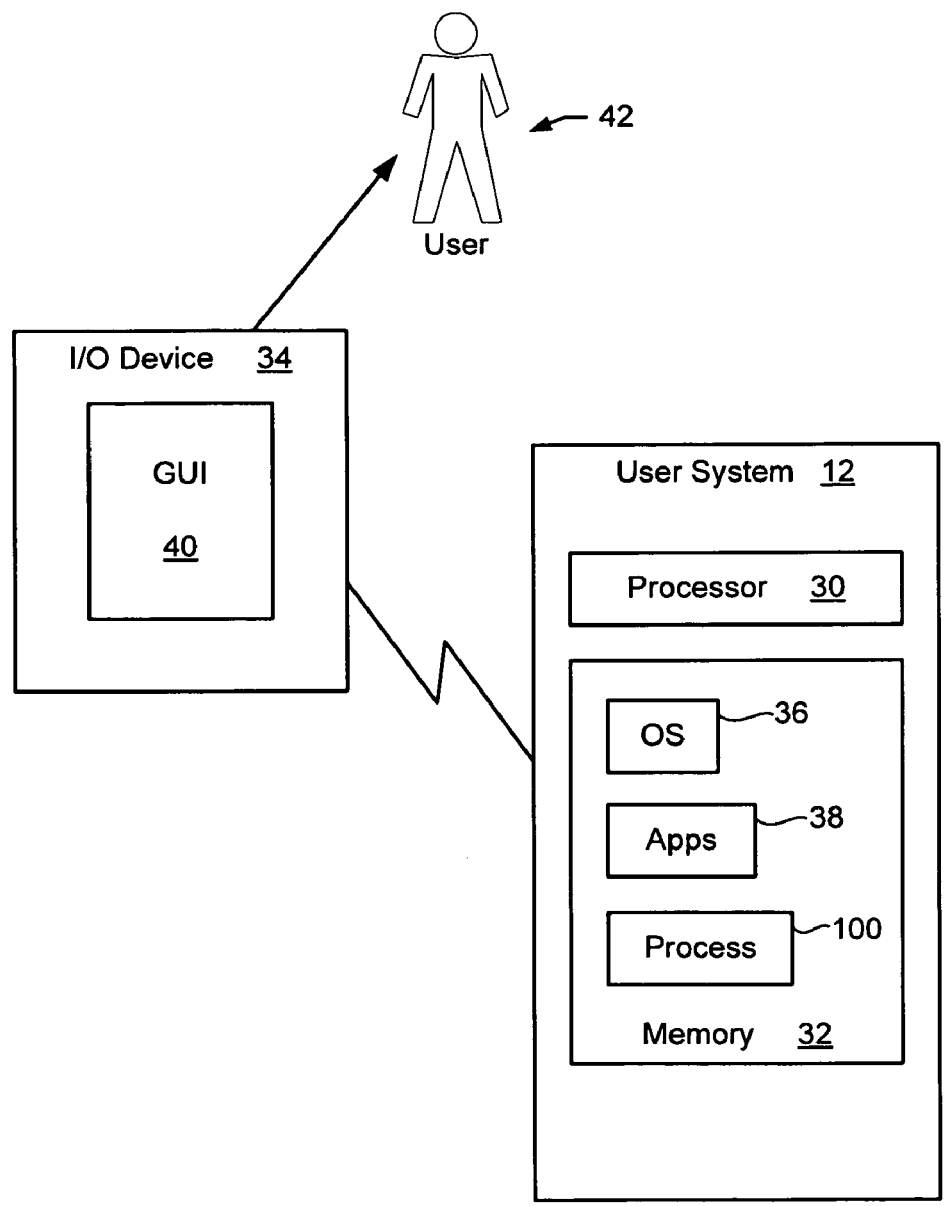
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsofti™ Office. The I/O device 34 can include a graphical user interface (GUI) 40 for display to a user 42.

Figure 3:
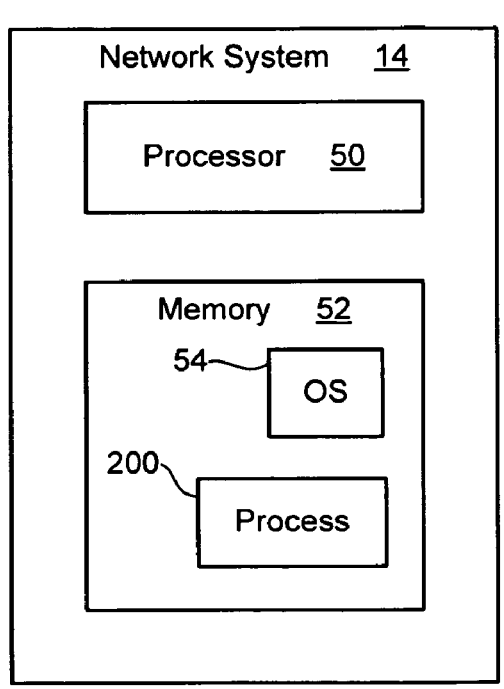
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below. In other embodiments, discussed in more detail below, one or more network systems may also include a data forwarding process 300 and/or a process 1300 (not shown in FIG. 3; see FIGS. 6 and 7 below).

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10 where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node.

In a like manner, when a request to retrieve data is received by the central server 14 from storage process 100, the requested data, which is being forwarded from node memory to node memory in the network 10, is retrieved.

Data forwarded in this manner can be segmented and segments forwarded as described above. Still, the segmented data is not stored on any physical storage medium in any network node, but merely forwarded from the memory of one node to the memory of another node.

Figure 4:
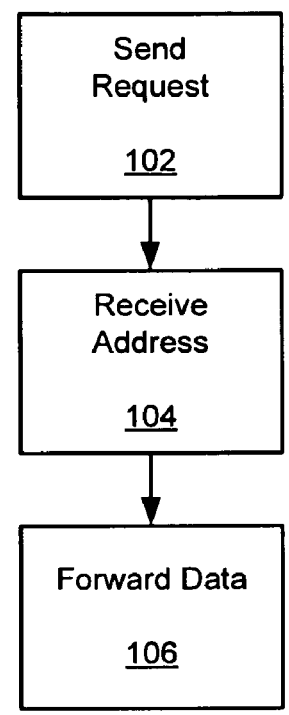
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network. If the request to the central server 14 is a store data request, storage process 100 receives (104) an address of a node from the central server 14 and forwards (106) the data to the node memory represented by the received address.

Figure 5:
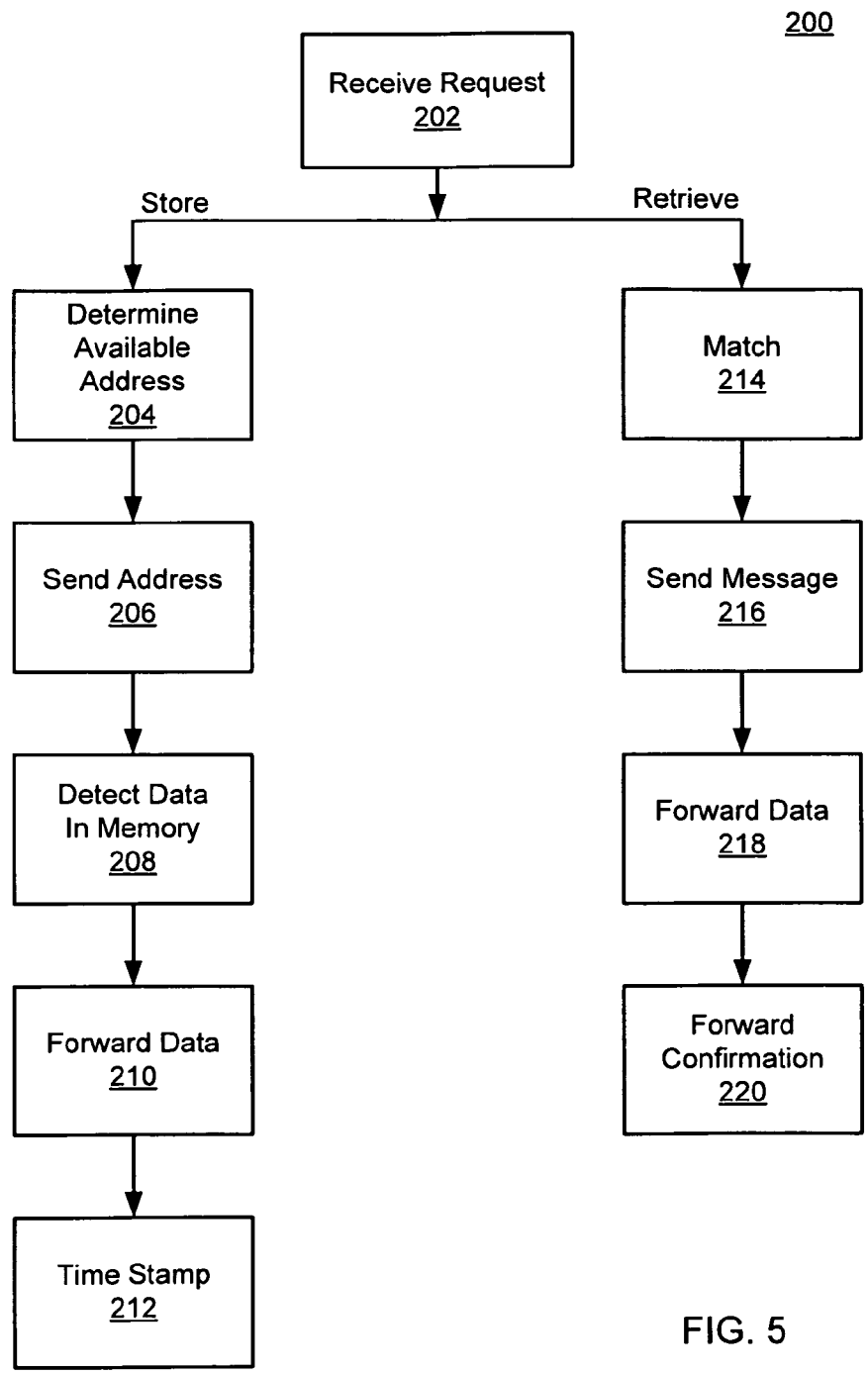
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors. Cloud resource 24 may be used by central server 14 to support computations associated with these functions and/or to store information used to implement these functions.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors. Cloud resource 24 also may be used by central server 14 to support computations associated with these functions and/or to store information used to implement these functions.

In one specific example, at the point of entry to a node, data undergoes an encrypted "handshake" with the node or central server 14 or user. This can be a public or private encryption system, such as the Cashmere system, which can use public-private keys. Cloud resource 24 also may be used to support computations associated with encryption and/or to store related encryption information (e.g., encryption keys).

Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data, the user's application functions to automatically ping the central server 14 that the data requested has been received. Thus, the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network. As mentioned above, cloud resource 24 may be used to provide some of these nodes or node states.

Individual nodes, nodes states and supernodes may also be extranet peers, wireless network peers, satellite-peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature. Central server 14 may use cloud resource 24 to support computations associated with such path alteration and/or elimination.

When interacting with cloud resource 24, process 200 may further include providing additional data forwarding storage node resources.

Cloud Resource

Exemplary embodiments of cloud resource 24 usage with network 10 are described in this "Cloud Resource" section below. In this section it should be noted that reference numbers in the 2000's are provided for purposes of reference only in the discussion—there are no corresponding figures. In this section, central server 14 may provide the function of "middleware" as described. In other embodiments, two or more central servers of network 10 may operate together to provide this middleware functionality.

Embodiments provide a method of transferring data to cloud resource 24 via middleware (e.g., processes to support this middleware run on central server 14). Exemplary methods include providing middleware having a plurality of nodes (e.g., two central servers), transferring data from a data resource to a particular node in the middleware, and transferring the data to cloud resource 24 based on the node to which the data was transferred. Exemplary methods include routing and acting upon queries to cloud resource 24 and results from cloud resource 24 based on the node to which the query or result is transferred.

In one embodiment, the data processing system may include middleware including a plurality of nodes and a plurality of data resources. The middleware is operatively coupled to cloud resource 24 and a user computing device (e.g., user system 12). The plurality of nodes includes nodes adapted to receive data from at least one of the plurality of data resources and forward the received data to cloud resource 24. The plurality of nodes includes nodes adapted to receive a query from the user computing device and forward the query to cloud resource 24 and nodes adapted to receive a result from cloud resource 24 and forward the result to the user computing device.

In another embodiment, the method of processing data may include receiving data gathered using one of a plurality of data resources by one of a plurality of nodes included in a middleware, where each of the plurality of nodes adapted to be in communication with at least one of the plurality of data resources and each of the nodes having a unique identifier relative to the other nodes of the plurality of nodes; transferring the data from the one of the nodes to a cloud resource 24 operatively connected to the middleware; recognizing the unique identifier of the one of the nodes from which the data was transferred; and identifying a category of the data based on the recognized unique identifier.

In yet another embodiment, the method of processing data may include receiving data gathered by one of a plurality of data resources by a middleware, where the one of the data resources having a unique identifier relative to other data resources of the plurality of data resources; recognizing the unique identifier of the one of the data resources by which the data was received; identifying a category of the data based on the recognized unique identifier; and transferring the data from the middleware to a cloud resource 24.

Computational processing by a cloud computing infrastructure may be enhanced when data is sent to the cloud in a uniform and organized manner. For example, real-time data gathered from many different points and devices (e.g., within network 10) may be routed to the cloud in an organized fashion. As described in greater detail below, the cloud may process incoming data based upon the route by which the data was transferred to the cloud. For example, the cloud may utilize the incoming data in a certain task, place the incoming data in a particular storage location, etc., based upon the route by which the data arrived at the cloud. Similarly, information transmitted from the cloud may be transferred via a particular route which may indicate to other components of the system that the data is to be acted upon in a certain manner.

Currently, computational systems with vast computing power are accessible to users via certain application sets. The application sets may be put in place by the owners or administrators of cloud resource 24, or the application sets may be installed by users under an special arrangement where users may install their own applications. User installation of applications, such as user-created custom applications, may be allowed only after the applications have been tested and approved by the owners or administrators of the cloud.

Some cloud applications are largely static, so configuring data for the cloud may be a key element of obtaining speedy computational results. In systems having middleware providing an interface to the cloud, processing time at the middleware can reduce the effective speed of the entire system. Many types of data (such as, for example and without limitation, environmental conditions, air traffic information, etc.) may need to be updated instantly, or as quickly as possible.

Data and application updates for the cloud may be transferred to the cloud using methods including middleware communication to the cloud, file transfer protocol (FTP) site updates to the cloud (which may be automatically downloaded), and/or direct user updates to cloud.

In exemplary embodiments, the middleware recognizes characteristics associated with the data (such as file type and IP address), then automatically routes the data based upon the characteristics to the cloud computing infrastructure in a way that synchs the data and application with the cloud resources so that the data is forwarded and configured to cloud resource 24 as the cloud needs to receive it to compute the newly-received data and generate related computational data using the installed application (e.g., to support computations of central server 14).

An exemplary embodiment relates to a system 2010 in which cloud resource 24 is asked to handle many simultaneous data points 2030 as those data points 2030 are routed to the cloud infrastructure 20 in a fast and organized structure by virtue of organized and sorted routing techniques. The design of the system 2010 utilizes the large memory resource of cloud resource 24 and simple rule programming for the memory of network nodes 2070 set up within the middleware 2040. (For example, a node may be a connection point, such as a redistribution point or an end point, for data transmission; generally, a node may have a programmed or engineered capability to recognize, process, and/or forward transmissions.)

Each node 2071, 2072, 2073, 2074, 2075, 2076 in the middleware may be programmed to receive data 2030 from a specific data resource 2032. In some exemplary embodiments, the data resource 2032 may be networked to that node 2071, 2072, 2073, 2074, 2075, 2076 alone. For example, each data resource 2032 may be operatively connected to a node 2071, 2072, 2073, 2074, 2075, 2076 using a unique identifier for the node, such as an IP address. (An Internet Protocol (IP) address is a numerical identification (logical address) that is assigned to devices participating in a computer network utilizing the Internet Protocol for communication between its components, for example.) Transmission of data to a particular node 2071, 2072, 2073, 2074, 2075, 2076 may be indicative of the exact kind of data (e.g., file type (such as .xls file data, .dat files, .mov files, etc.), the source of the data (e.g., location where gathered, type of device, etc.), or any other categorical distinction between data 2030.

In some exemplary embodiments, a device may be connected to a plurality of nodes 2071, 2072, 2073, 2074, 2075, 2076, but may transfer only one type of data 2030 to any one of the nodes 2071, 2072, 2073, 2074, 2075, 2076. For purposes of clarity, the term data resource as used herein refers to a source of a particular category of data 2030. Thus, a single device may act as more than one data resource if it transfers different categories of data to different nodes, for example.

In exemplary embodiments, cloud resource 24 may receive the data 2030 from the middleware nodes 2071, 2072, 2073, 2074, 2075, 2076. Cloud resource 24 may identify the database location where the data 2030 will be written, the particular application that is to process the data, etc. by recognizing the unique identifier (such as the IP address) of the node 2071, 2072, 2073, 2074, 2075, 2076 through which the data 2030 was relayed. This recognition may be implemented by an application 2026, which may have been installed in cloud resource 24 by the middleware 2040 (or which may have been caused to be installed in cloud resource 24 by the middleware 2040). In some embodiments, the cloud resource's 24 identification of which of the nodes 2071, 2072, 2073, 2074, 2075, 2076 the data 2030 was transmitted from may allow cloud resource 24 to quickly ascertain the file type, proper destination, etc. for the received data 2030. The cloud resource 24 may be programmed to receive data 2030 from the individual nodes 2071, 2072, 2073, 2074, 2075, 2076 from the middleware 2040 and to sort the data 2030 and subsequently configure the data 2030 to the specific database table using the IP address, for example, as an identifier to indicate what kind of application 2026 the data 2030 is related to, the type of data, and, subsequently, where that data 2030 needs to be placed within an existing database which may be managed and stored within cloud resource 24.

An exemplary routing system may allow the middleware 2040 to log activity pertaining to cloud resource 24 and may allow the data 2030 to pass through the middleware 2040 to cloud resource 24 in an expedited fashion. An exemplary system may require no more from the middleware 2040, after the programming has been done to recognize and match the data source 2032 to the IP node 2071, 2072, 2073, 2074, 2075, 2076, than for the node 2071, 2072, 2073, 2074, 2075, 2076 to forward the data 2030 to the IP address at the cloud recourse 24 configured to receive the data 2030. Middleware 2040 system logs may then translate the node activity to create logs matching specific data sources 2032 to the data 2030 received by the cloud resource 24. These logs may later be reconciled with cloud resource 24 using time stamps to fill in the exact details of what data 2030 was received by cloud resource 24 at what time, should it become necessary for the middleware 2040 to hold that information. As used herein, logging may refer to producing a record including information pertaining to the data transferred, the transaction conducted, the query transmitted, etc. and/or it may refer to producing a record including a copy of all or part of the data transferred.

The more data points that are in use, the more time that may be saved by the system and the more efficient the process may become. Further, certain data resources 2032 collecting similar data that is entered into the same data module in a database may utilize the same node 2071, 2072, 2073, 2074, 2075, 2076 within the middleware 2040 to transfer data 2030 when the needs of the database do not need to discriminate to log the data into certain fields of the database.

Similarly, when cloud resource 24 provides a result 2022 to the middleware 2040 in response to a user query 2052, the middleware 2040 may identify this action by recognizing the specific node which receives the response from cloud resource 24. This can spur an immediate forwarding process in the middleware where the result 2022 from cloud resource 24 automatically, once received at the middleware 2040, forwards to, and is translated by, the middleware 2040 into a format specific response 2054 intended for the end user's device 2050 and format specifications.

Exemplary embodiments provide a system that updates information to a cloud resource 24 utilizing a middleware 2040 routing system which handles exterior transactions with great speed and slots data 2030 into an organized path for the cloud resource 24 computing infrastructure. The cloud resource 24 is employed along with middleware 2040 to handle complex data analysis and to provide orderly and efficient packaging of responses to end user devices 2050. By routing the data from the middleware 2040 in an expedited process, cloud resource 24 can more efficiently process the information and return a response to the middleware 2040 or end user 2050.

In an exemplary embodiment, data 2030 from a plurality of data sources 2032 may be transferred to the middleware 2040 by data routing nodes 2070. The middleware 2040 may transfer the data 2030 to the cloud resource 24. A user device 2050 may send a query 2052 to the middleware 2040, which may send a query 2024 to the cloud resource 24. The query may trigger the functions of a particular application 2026 resident in the cloud. The application 2026 (and any updates thereto) may be transmitted to the cloud resource 24 from the middleware 2040 as well. The cloud resource 24 may return a result 2022 to the middleware 2040. The middleware 2040 may receive the result 2022 and forward a result 2054 to the user device 2050 after performing any necessary formatting or packaging of the result 2022 received from the cloud resource 24.

Exemplary middleware architecture 2060 may include components such as user interface applications 2061, application engines 2062, business components 2063, a hardware abstraction layer 2064, and hardware 2065.

Exemplary cloud computing architecture may include a user interaction interface 2120, systems management component 2122, a provisioning tool 2124, a service catalog 2126, monitoring and metering components 2128, and servers 2130, which may include one or more servers and/or one or more virtual servers. The user interaction interface may interact with the system management component 2122 and the service catalog 2126. The systems management component 2122 may interact with the user interaction interface 2120, the service catalog 2126, the monitoring and metering components 2128, and the provisioning tool 2124. The provisioning tool 2124 may interact with the system management component 2122, the service catalog 2126, and the servers 2130. The servers 2030 may interact with the provisioning tool 2124 and the monitoring and metering components 2128. The monitoring and metering components 2128 may interact with the systems management component 2122 and the servers 2130. The service catalog 2126 may interact with the user interaction interface 2120, the systems management component 2122, and the provisioning tool 2124.

The cloud resource 24 of exemplary embodiments may include one or more servers and/or one or more supercomputers. Further, the cloud resource 24 may include one or more virtual servers. The middleware 2040 may run on one or more servers (e.g., central server 14 and/or other central servers of network 10) and/or one or more virtual servers. The user device 2050 may include any client computing device, for example and without limitation, a desktop computer, a notebook computer, or a handheld computing device. The user device 2050 may be operatively connected to middleware 2040 using a wired or wireless network, for example. Exemplary data resources 2032 may include any device capable of gathering any type of data and transmitting the data to the middleware. For example and without limitation, data resources may include computing devices (such as desktop, notebook, or handheld computers), global positioning system (GPS) units, environmental parameter measuring devices (such as thermometers, anemometers, hygrometers, etc.), radar unites, cameras, and/or microphones. Also, the data resource 2032 may be operatively connected to the middleware 2040 (and the nodes 2071, 2072, 2073, 2074, 2075) by a wired or wireless network, for example.

Exemplary embodiments may include various data security or integrity features. For example, any or all of data 2030, queries 2052, 2024, and results 2022, 2054 may be encrypted prior to transfer and may be decrypted after receipt. In some embodiments, data 2030 may be stored within cloud resource 24 in an encrypted or password protected form. Notably, even when data 2030 is encrypted (and therefore the contents of the data 2030 may not be immediately apparent), the above-described routing system of the present disclosure may allow the cloud resource 24 to properly utilize incoming data 2030. For example, when one of the data sources 2032 transfers data to the cloud resource 24 via a particular one of the nodes 2071, 2072, 2073, 2074, 2075, 2076 in the middleware 2040, the cloud may take action on the receipt of the data 2030 without having to decrypt the data 2030 because the cloud may be programmed to recognize that all data 2030 coming from a certain IP address includes a certain file type, is to be treated a certain way, trigger a certain application, etc.

In some exemplary embodiments, the nodes 2071, 2072, 2073, 2074, 2075 may create one or more secure tunnels with data sources 2032 and/or the cloud resource 24. Such an implementation may provide assurances that the data 2030 is not subject to interception and/or that only the desired data 2030 is transmitted via the nodes 2071, 2072, 2073, 2074, 2075. The cloud may include password protection, or other security features, on databases and/or applications, for example.

In some exemplary embodiments, a similar routing system may be implemented for queries 2052 from user devices 2050 and/or for results 2022 from the cloud resource 24. For example, a particular type of user query 2052 may be transmitted to a particular node in the middleware 2040. The middleware 2040 may be programmed to act upon queries 2052 received at that node in a particular manner, which may obviate the need for the middleware 2040 to interpret the incoming query 2052. For example, the middleware 2040 may be programmed to automatically forward queries 2052 received at a particular node to the cloud resource 24. Similarly, the middleware 2040 may be programmed to perform certain actions upon receipt of a result 2022 from the cloud resource 24 by a certain node. For example, results 2022 received at a particular node may automatically be forwarded to a particular user device 2050. In some embodiments, the middleware 2040 may be programmed to perform certain reformatting or conditioning on data 2030, queries 2052, or results 2022, for example. Such conditioning may include configuring or translating data 2030, queries 2052, or results 2022 to be compatible with a specific file type, database, application, format and/or specification.

In some exemplary embodiments, the middleware 2040 may recognize a characteristic (such as a file type or IP address) associated with the data 2030. The middleware 2040 may automatically route the data 2030 based upon the characteristic. For example, data 2030 received by the middleware 2040 from a particular IP address may be conditioned in a predetermined manner before it is forwarded to the cloud resource 24, while data received from a different IP address may be routed directly to the cloud resource 24 without conditioning.

Data File Forwarding and Search

In this embodiment, memory 52 can include a data file forwarding process 3200, a search process 3300, and a retrieval process 3400, described below. Network 10 may store, delete, search, and retrieve data files, as discussed below.

When a request to store a data file is received by central server 14 from storage process 100, the data file is directed to a node memory in network 10 where it is then continuously forwarded from node memory to node memory in the network 10 by the data file forwarding process 3200 in each of the network nodes without storing on any physical storage medium, such as a disk drive. The forwarded data file resides only for a very brief period of time in the memory of any one node in the network 10.

When a request to retrieve a data file is received by the central server 14 from storage process 100, the requested data file, which is being forwarded from node memory to node memory in the network 10, is retrieved.

Figure 8:
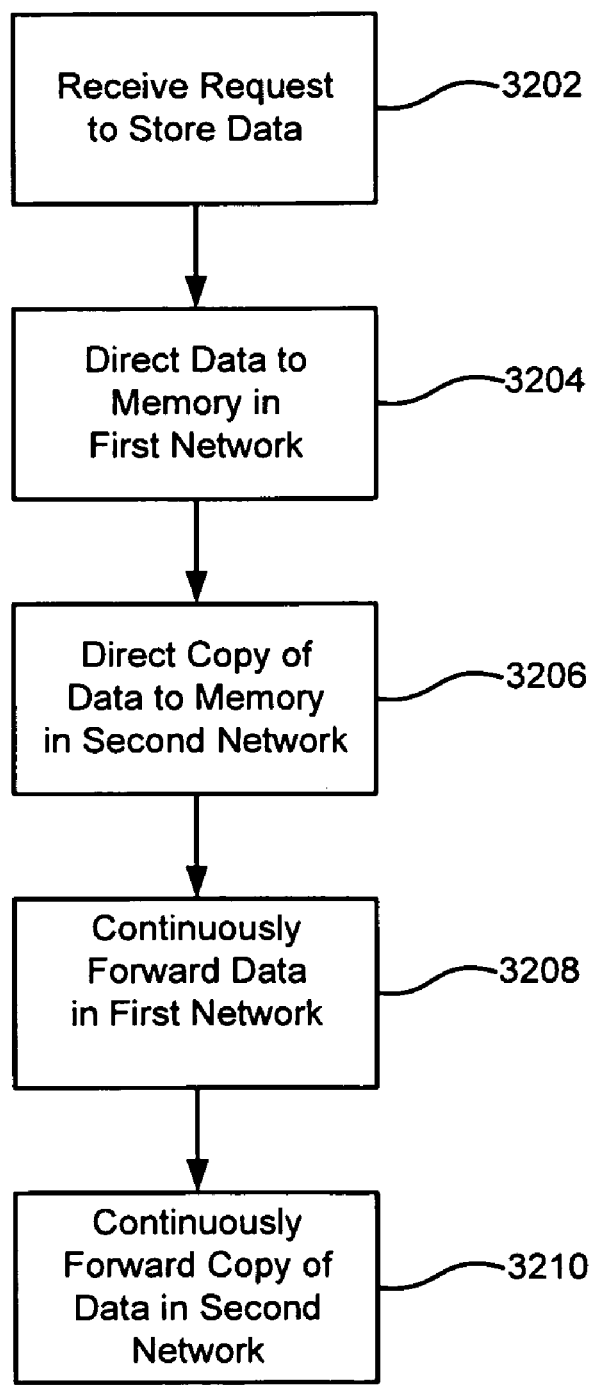
FIG. 8 is a flow diagram of a process.

As shown in FIG. 8, data file forwarding process 3200 includes receiving (3202) a request from a source system in a first network to store a data file.

Process 3200 directs (3204) the data file to a computer memory in a network. Process 3200 saves (3206) a file name of the data file, and in some implementations, a file type, a username and a date stamp, in an index file associated with the central server 14; the actual data contained in the data file is not stored on any physical medium. The index file is used to search for data files during the search process 3300, described below. Process 3200 scrambles (3208) a copy of the contents of the data file and saves (3210) the copied scrambled data in memory or on a physical storage device associated with the central server 14.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (3208) a copy of the above data file may, in one example, results in the following scrambled data:

to without storing on a physical medium example node this contained exemplary herein file from maintained text data. and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 3200 continuously forwards (3212) the data file from the first computer memory to other computer memories in the network without storing on any physical storage device in the network. Continuously forwarding (3212) includes detecting a presence of the data file in memory of the specific node of the network and forwarding the data file to another computer memory of a node in the network of interconnected computer system nodes without storing any physical storage device.

Figure 9:
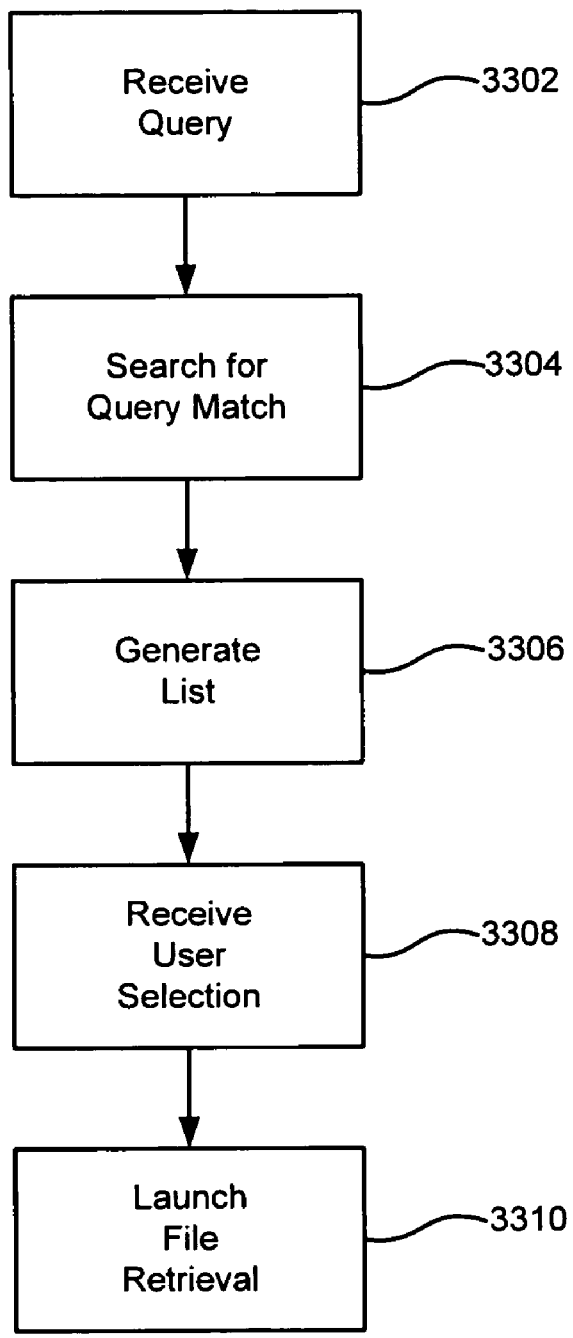
FIG. 9 is a flow diagram of a process.

As shown in FIG. 9, the search process 3300 includes receiving (3302) a query. Example queries include filenames, file types, usernames, dates and so forth. In one example, the query is a keyword or keywords. Search process 3300 searches (3304) the database of scrambled files represented by the index of file names for a match of the keyword or keywords. If a match of the keyword or keywords is found among the scrambled files, process 3300 generates (3306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 3300 receives (3308) a user selection of one of the filenames contained in the generated list of file names. The user selection can include a mouse click, a key board input, an audio input, and so forth, indicating a selected filename.

Process 3300 launches (3310) a file retrieval process 3400.

Figure 10:
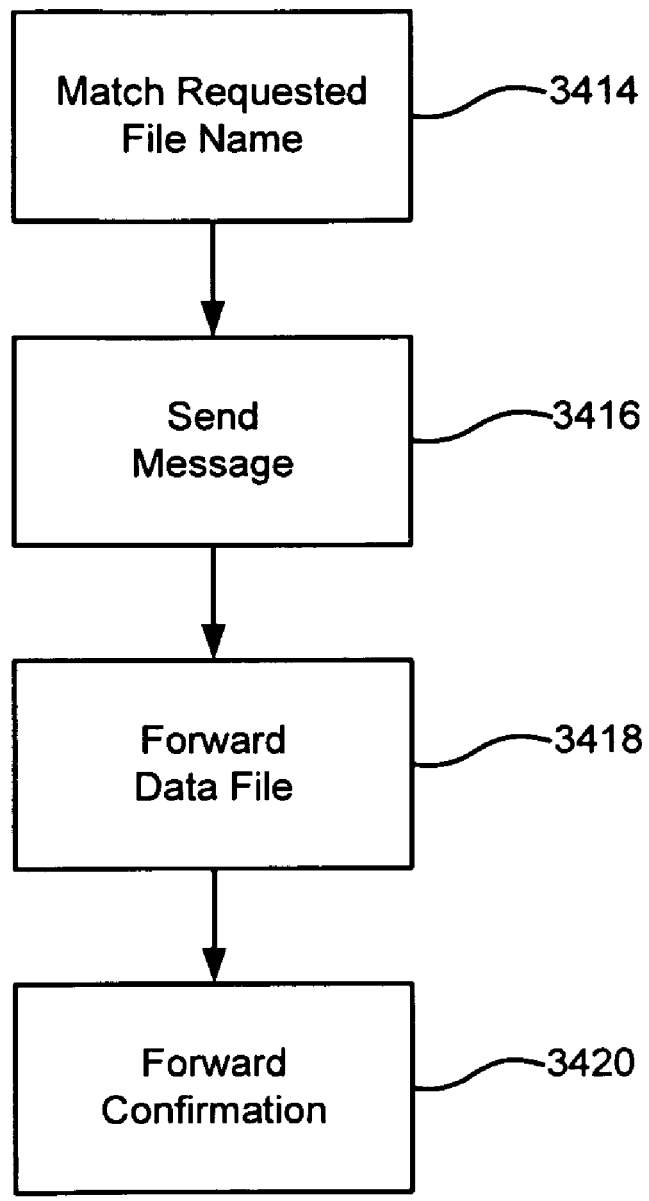
FIG. 10 is a flow diagram of a process.

As shown in FIG. 10, the file retrieval process 3400 matches (3414) the requested filename at the central server using a hash mark or other unique code that can be "sniffed" by the node upon the data entering the node via the encryption handshake. This can occur by pinging the nodes in the network. Process 3400 sends (3416) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 3400 forwards (3418) in node memory the data to the requester and forwards (3420) a confirmation message that the data has been sent to the user. This routing message may be sent directly to the central server or may be passed to the central server or servers via other node(s) or supernode(s) in the network 10. Upon the user receiving the requested data the user's application functions to automatically ping the central server that the data requested has been received.

In another embodiment, storage process 100 only stores the scrambled data along with filename, and in some instances, file type, username, and/or date stamp, while automatically deleting the non-scrambled data file.

Redundant Data

In one embodiment, network 10 may be used as a continuous redundant data forwarding system, i.e., data and copies of data are stored by continually forwarding it from one node memory to another node memory. Copies of data may continuously forwarded in one or more networks.

When a request to store data is received by central server 14 from storage process 100, data is directed to a node in the network 10 where it is then continuously forwarded from node memory to node memory in the network 10 by the data forwarding process 3200 in each of the network nodes without storing on any physical storage medium such as a disk drive. The request to store data makes at least one copy of the data, which is directed to a node in a secondary private or public network, or directed to nodes on more than one network, where it too is continuously forwarded from node memory to node memory in the secondary private or public network. Data and copies of data are not stored on any physical storage medium in any network node.

When a request to retrieve data is received by the central server 14 from storage process 100, the requested data, which is being forwarded from node memory to node memory in the network 10, is retrieved.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) first address of a node and a second address of a node from the central server 14 and forwards (106) the data to the node memory represented by the received first address and a copy of the data to the node memory represented by the received second address.

As shown in FIG. 8, data forwarding process 3200 includes receiving (3202) a request from a source system in a first network to store data.

Process 3200 directs (3204) the data to the first computer memory in a first network and directs (3206) a first copy of the data to a second computer memory in a second network. Directing (3206) may be to node memories in one or more networks, both private and/or public.

Process 3200 continuously forwards (3208) the data from the first computer memory to other computer memories in the first network without storing on any physical storage device in the first network.

Continuously forwarding (3208) includes detecting a presence of the data in memory of the specific node of the first network and forwarding the data to another computer memory of a node in the first network of interconnected computer system nodes without storing any physical storage device.

Process 3200 continuously forwards (3210) the first copy of the data from the second computer memory to other computer memories in the second network without storing on any physical storage device in the second network.

Continuously forwarding (3210) includes detecting a presence of the first copy of data in memory of the specific node of the second network, and forwarding the first copy of the data to another computer memory of a node in the second network of interconnected computer system nodes without storing any physical storage device.

Deletion of Data File

Figure 11:
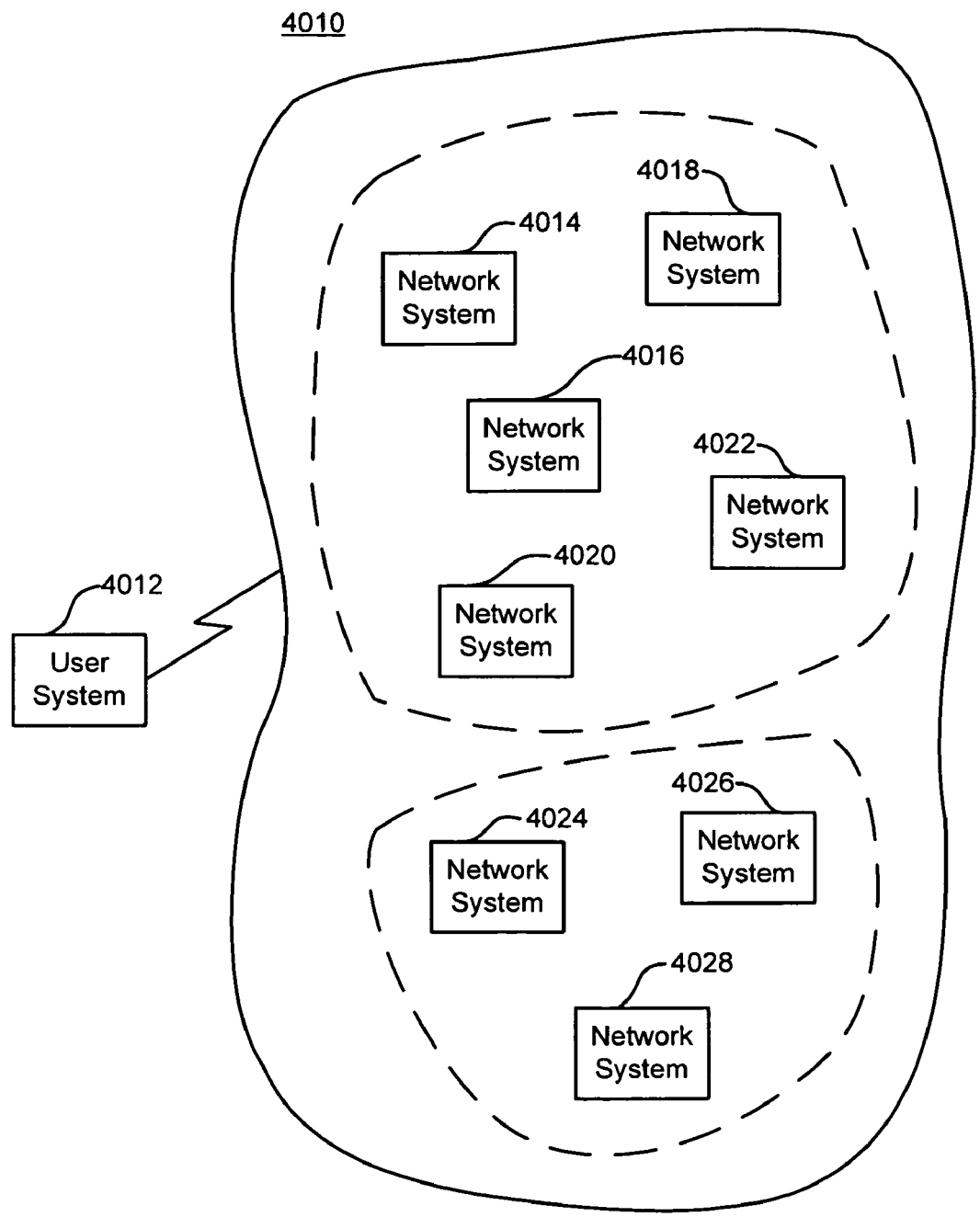
FIG. 11 is a block diagram of an exemplary framework.

In one embodiment, as shown in FIG. 11, an exemplary framework 4010 includes a user system 4012 and a number of network systems 4014, 4016, 4018, 4020, 4022. User system 4012 and network systems 4014, 4016, 4018, 4020, 4022 may generally use hardware as described for user system 12 and network systems 14, 16, 18, 20, and 22 of FIG. 1, discussed above. Also, cloud resource 24 (FIG. 1) may be used to support functions of central servers in these network systems as discussed above.

Each of the network systems 4014, 4016, 4018, 4020, 4022 can be considered to be a node in the framework 4010 and one such network system may be designated as a central server, such as network system 4014, which may assume a control position in framework 4010. Each of the nodes 4014, 4016, 4018, 4020, 4022 may be established as a privately controlled network of peers under direct control of the central server 4014. Peered nodes may also be a mix of private and public nodes, and thus not under the direct physical control of the central server 4014. The framework 4010 may also be wholly public where the central server 4014 (or servers) has no direct ownership or direct physical control of any of the peered nodes.

In one example, nodes 4014, 4016, 4018, 4020 and 4022 are considered to be a private network. In a private network, an administrator controls the nodes and may designate which node is the central server. The framework 4010 can also include one or more additional nodes. For example, nodes 4024, 4026 and 4028. These nodes 4024, 4026 and 4028 are considered to be part of one or more public networks in which the administrator has little or no control.

Memory 32 may be used in user system 4012 and can include a storage process 4100. Memory 52 may be used in each of the network systems 4014, 4016, 4018, 4020, 4022 and can include a data file forwarding process 4200, a search process 4300, and a retrieval process 4400, described below.

One network system, such as network system 4022, is designated as a deletion node, more fully described below. Memory of the deletion node 4022 does not include a data file forwarding process 4200, search process 4300, and retrieval process 4400. Any data file received by the deletion node is not forwarded or saved. New data received in the memory of the deletion node overwrites old data received by the memory of the deletion node. In effect, the deletion node 4022 acts as a black hole for data files forwarded to it.

In this section, the terms "data file" are used to represent all file and media types handled by the system, such as, for example, files for data, program files, audio files, video files, picture files, and so forth. Data files being forwarded in framework 4010 can be deleted and thus no longer forwarded from node memory to node memory.

Figure 12:
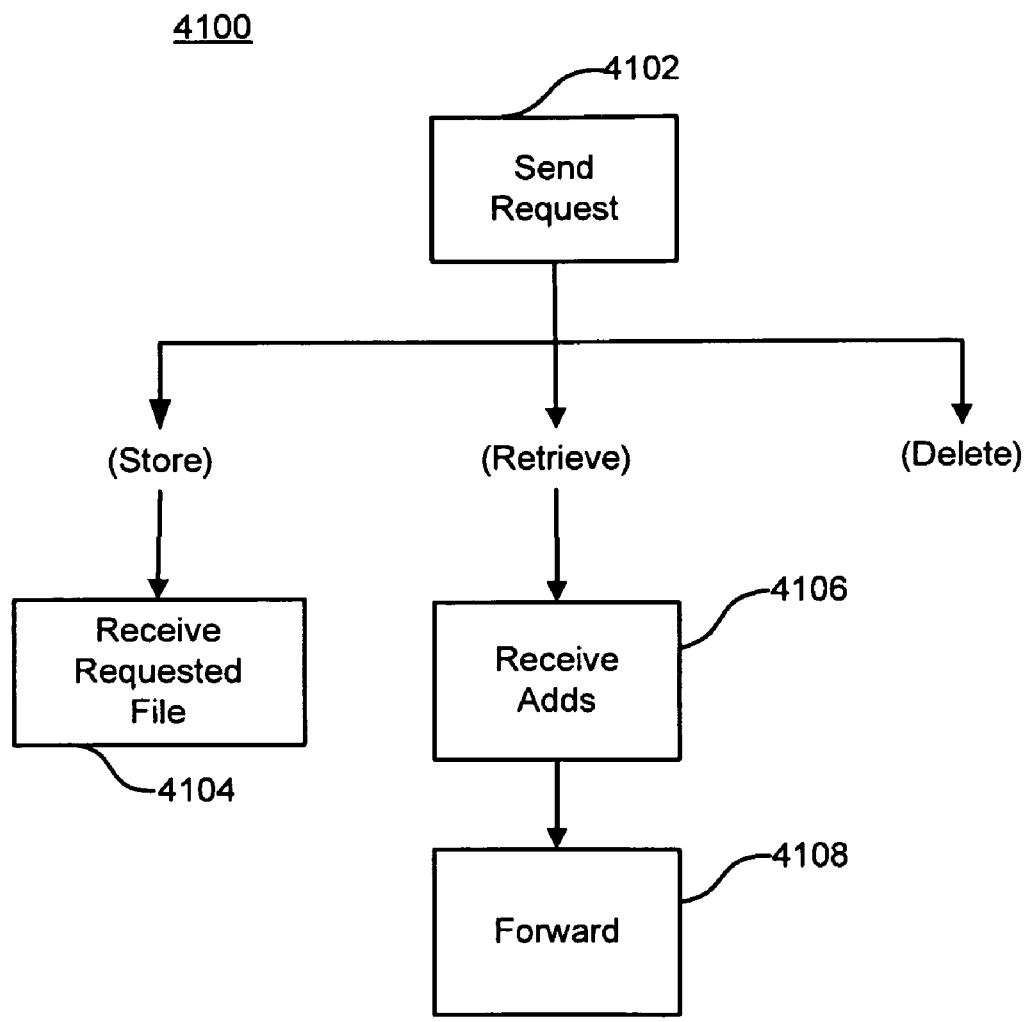
FIG. 12 is a flow diagram of a process.

In one embodiment, as shown in FIG. 12, storage process 4100 includes sending (4102) a request to a central server 4014 to store, retrieve or delete a data file. If the request is a retrieve data file request, storage process 4100 receives (4104) the requested data file from the central server 4014 or node in the network.

If the request to the central server 4014 is a store data file request, storage process 4100 receives (4106) an address of a node from the central server 4014 and forwards (4108) the data file to the node memory represented by the received address.

Figure 13:
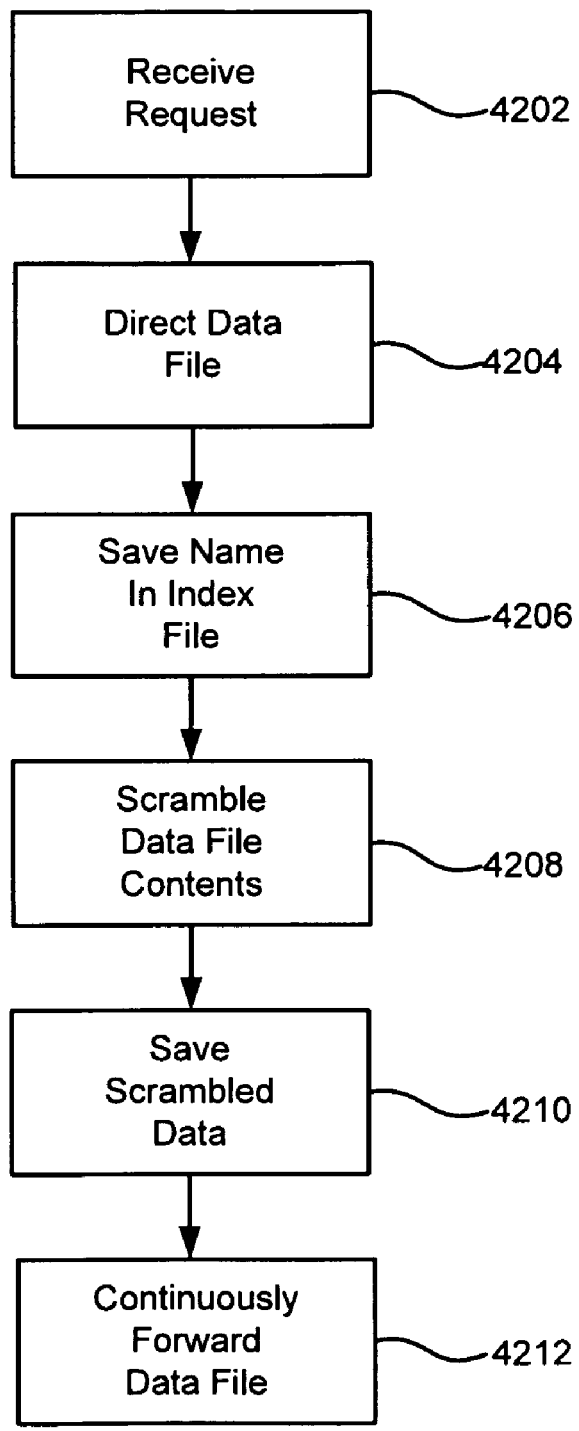
FIG. 13 is a flow diagram of a process.

As shown in FIG. 13, data file forwarding process 4200 includes receiving (4202) a request from a source system in a network to store a data file.

Process 4200 directs (4204) the data file to a computer memory in a network. Process 4200 saves (4206) a file name of the data file, and in some implementations, a file type, a username and a date stamp, in an index file associated with the central server 4014; the actual data contained in the data file is not stored on any physical medium. The index file is used to search for data files during the search process 4300, described more fully below. Process 4200 scrambles (4208) a copy of the contents of the data file and saves (4210) the copied scrambled data in memory or on a physical storage device associated with the central server 4014.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (4208) a copy of the above data file may, in one example, results in the following scrambled data:

to without storing on a physical medium example node this contained exemplary herein file from maintained text data. and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 4200 continuously forwards (4212) the data file from the first computer memory to other computer memories in the network without storing on any physical storage device in the network. Continuously forwarding (4212) includes detecting a presence of the data file in memory of the specific node of the network and forwarding the data file to another computer memory of a node in the network of interconnected computer system nodes without storing any physical storage device.

Figure 14:
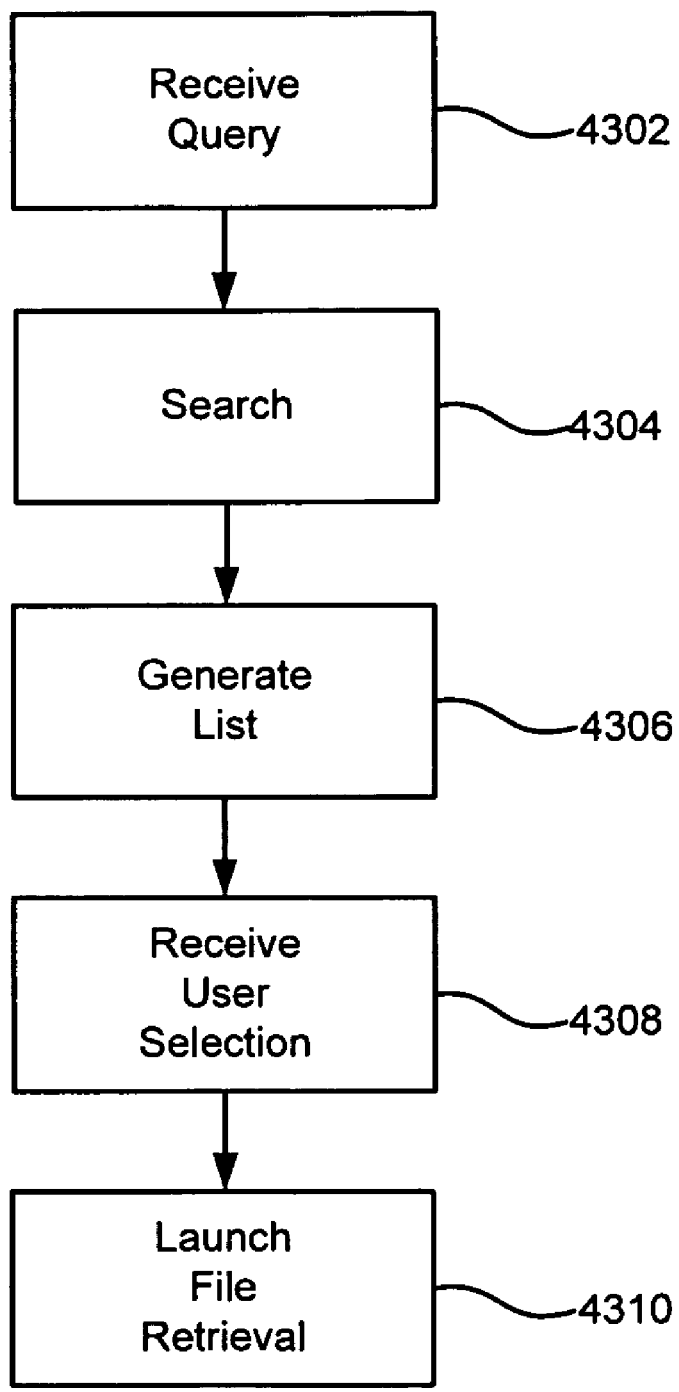
FIG. 14 is a flow diagram of a process.

As shown in FIG. 14, the search process 4300 includes receiving (4302) a query. Example queries include filenames, file types, usernames, dates and so forth. In one example, the query is a keyword or keywords. Search process 4300 searches (4304) the database of scrambled files represented by the index of file names for a match of the keyword or keywords. If a match of the keyword or keywords is found among the scrambled files, process 4300 generates (4306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 4300 receives (4308) a user selection of one of the filenames contained in the generated list of file names. The user selection can include a mouse click, a key board input, an audio input, and so forth, indicating a selected filename.

Process 4300 launches (4310) a file retrieval process 4400.

Figure 15:
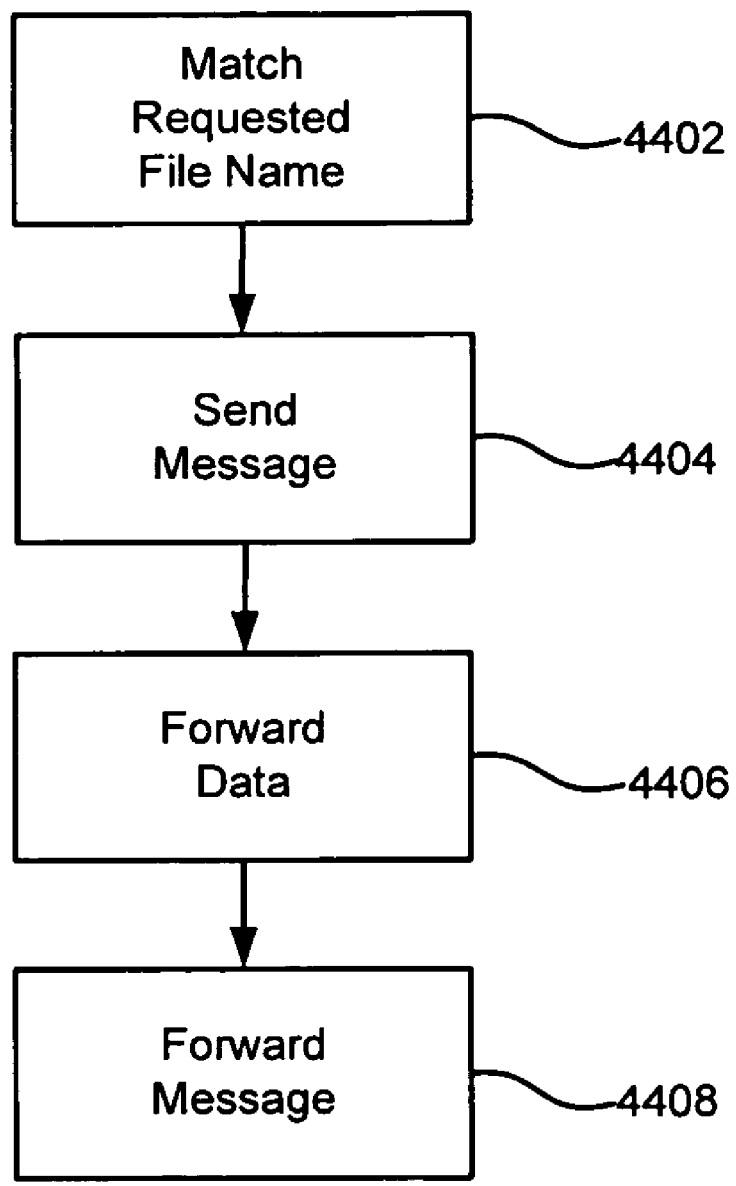
FIG. 15 is a flow diagram of a process.

As shown in FIG. 15, the file retrieval process 4400 matches (4402) the requested filename at the central server using a hash mark or other unique code that can be "sniffed" by the node upon the data entering the node via the encryption handshake. This can occur by pinging the nodes in the network. Process 4400 sends (4404) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 4400 forwards (4406) in node memory the data to the requester and forwards (4408) a confirmation message that the data has been sent to the user. This routing message may be sent directly to the central server or may be passed to the central server or servers via other node(s) or supernode(s) in the framework 4010. Upon the user receiving the requested data the user's application functions to automatically ping the central server that the data requested has been received. Thus, the framework 4010 creates data storage without caching, downloading and/or storing the data on any physical storage medium. Data storage and management is accomplished via a continuous routing of the data from node memory to node memory.

In another embodiment, storage process 4100 only stores the scrambled data along with filename, and in some instances, file type, username, and/or date stamp, while automatically deleting the non-scrambled data file.

If the request to the central server 4014 is a delete data file request, the central server 4014 launches a file deletion process 4500.

Figure 16:
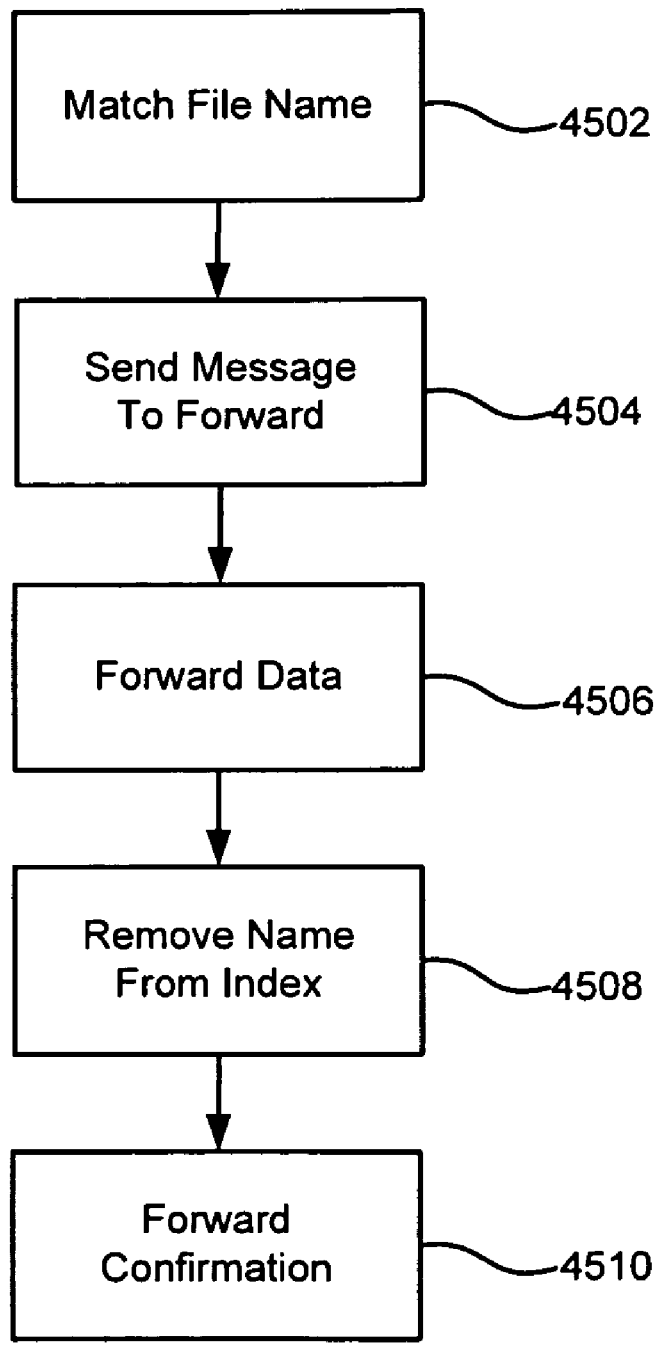
FIG. 16 is a flow diagram of a process.

As shown in FIG. 16, process 4500 matches (4502) the filename to delete at the central server 4014 using a hash mark or other unique code that can be "sniffed" by the node upon the data entering the node via the encryption handshake. This can occur by pinging the nodes in the network. Process 4500 sends (4504) the message to forward the data to the deletion node 4028 directly to the node or node state where the central server believes the data will likely appear.

Process 4500 forwards (4506) in node memory the data to the deletion node. Process 4500 removes (4508) the data file name from the index and forwards (4510) a confirmation message that the data has been deleted to the user. This routing message may be sent directly to the central server or may be passed to the central server or servers via other node(s) or supernode(s) in the framework 4010.

The framework 4010 creates data storage without caching, downloading and/or storing the data on any physical storage medium. Data storage and management is accomplished via a continuous routing of the data from node memory to node memory, the forwarded data only downloaded when the user requests the data to be returned to the user from the framework 4010.

Multi-Homing

In one embodiment, cloud resource 24 may be used to support multi-homing data storage, discussed in more detail below.

A node typically has one network interface with one associated network address. However, a node may include multiple network interfaces, each with their own associated non-loopback network address, such as a non-loopback Internet protocol (IP) address. Furthermore, a node may include a network interface with multiple associated non-loopback network addresses, such as multiple non-loopback IP addresses. Such a node is referred to as a "multi-homed node."

For example, the Internet Engineering Task Force (IETF) has developed IP version 6 (IPv6). The hierarchical layers provided by IPv6 may change the way multi-homing devices within a network are perceived. In IPv4, multi-homing is generally perceived as a host or system that uses multiple network interfaces. In contrast, hosts in IPv6 may only have one network interface, but respond to multiple global IPv6 addresses, link-local addresses, and site-local addresses. As a result, almost every host in the IPv6 network can be a multi-homed host.

Process 200 can be modified and enabled within a single computer system that includes multiple IP (IP) addresses (e.g., 2001:db8::1, 2001:db8::2 and 2001:db8::3 in IPv6), but only one physical upstream link. This is sometimes referred to as single link, multiple IP address (spaces) multi-homing.

As described above, a device can be multi-homed (e.g., host-centric multi-homing), when it has more than one interface, and each of the interfaces is attached to different networks (may be within a multi-homed network). In addition, in IPv6, each interface can have multiple addresses, which means that even with a single interface, a host can be multi-homed.

Multi-homing can provide a certain degree of resilience/redundancy against failures (link, hardware, protocols, others) and also enables features such as load balancing. Moreover, multi-homing can be used in order to differentiate traffic based on policy, for non-technical reasons, such as cost associated with different flows, time of the day, and so forth. For highly distributed enterprises, it can also occur as an aid to address that enterprise's geographical distribution, and as a traffic engineering mechanism to improve local performance such as latency and hop count reductions for real time protocols.

With single link, multiple IP address (spaces) multi-homing, a modified process 200 forwards data in memory within a single computer having multiple assigned IP addresses. When the computer is powered-off or experiences a failure, such as loss of power, all data being forwarded in memory is automatically forwarded to a node memory in the network 10, where it is continually routed/forwarded from node memory to node memory in the network 10 according to process 200. When power is restored to the computer, data is recovered/reloaded from the network 10 and then continuously forwarded within the memory of the computer without ever being fixed in physical storage.

Data forwarded from memory location to memory location within a single computer system can also be periodically forwarded to the network 10 to provide backup and redundancy.

Figure 6:
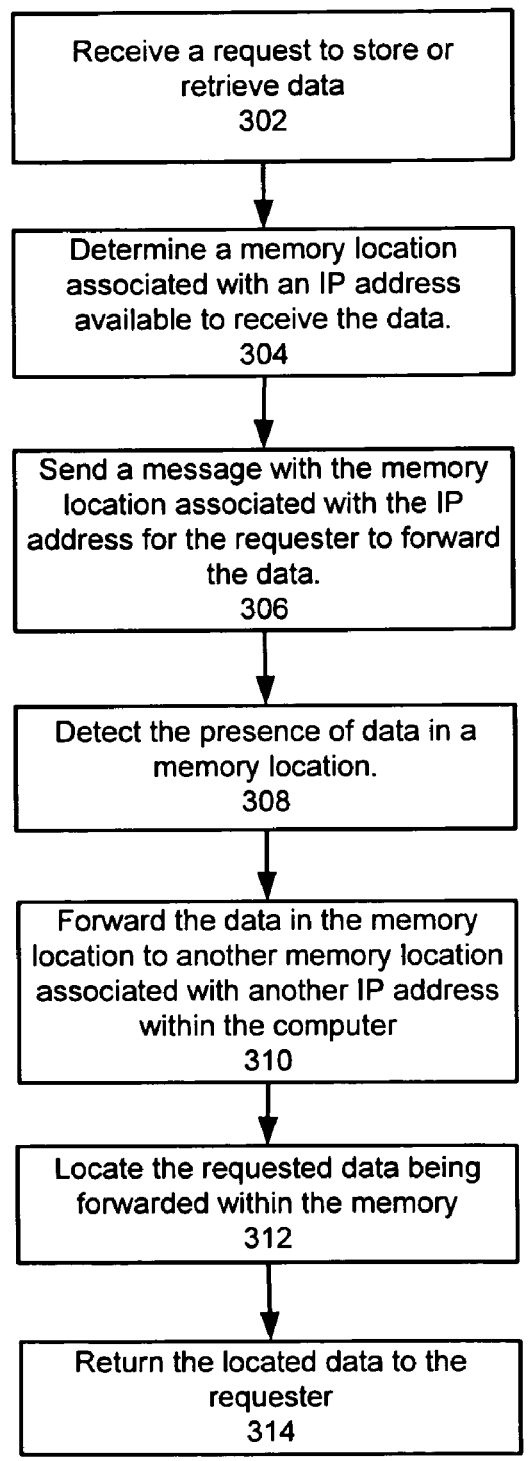
FIG. 6 is a flow diagram of a process.

As shown in FIG. 6, data forwarding process 300 includes receiving (302) a request to store or retrieve data. If the received request is a request to store data, data forwarding process 300 determines (304) a memory location associated with an IP address available to receive the data.

Process 300 sends (306) a message with the memory location associated with the IP address for the requester to forward the data.

Process 300 detects (308) the presence of data in a memory location. Process 300 forwards (310) the data in the memory location to another memory location associated with another IP address within the computer and continues to repeat detecting (308) and forwarding (310) of the data from memory location associated with one IP address to a memory location associated with another IP address.

If the received request is a request to retrieve data being continuously forwarded from memory location to memory location, data forwarding process 300 locates (312) the requested data being forwarded within the memory and returns (314) the located data to the requester.

Thus, memory associated with multiple IP addresses within a single system creates data storage without caching, downloading and/or storing the data on any physical storage medium. Data storage and management is accomplished via a continuous routing of the data from memory location associated with one IP address to memory location associated with another IP address.

The approach above may be incorporated into any type of computer system, such as, a wireless device, personal data assistant (PDA), laptop, personal computer (PC), and so forth.

Advertisement Forwarding Storage and Retrieval

In one embodiment, cloud resource 24 may be used to support advertisement storage and retrieval, discussed in more detail below.

The data forwarding storage and management system in which the data is never fixed in physical storage, but in fact, is continually being routed/forwarded from node memory to node memory in the network, can be used as a backend system(s) in many applications that currently used fixed medium storage. In one example, this data forwarding storage and management system where the data is continually being routed/forwarded from node memory to node memory in the network is used as an advertisement forwarding and retrieval system. Advertisement is deployed into the data forwarding storage and management system from a master server or control station and recalled on demand or in response to a stimulus or activity.

Here, we consider advertisement as a broad term that can include any content, including, but not limited to, text, audio, visual or any combination thereof. Advertisement can be deployed into the data forwarding storage network and recalled/retrieved when needed, e.g., directed to an IP address of a specific user system, directed to paid and/or unpaid subscribers of applications within the data forwarding storage network, and/or directed to users outside of the data forwarding storage network. Advertisement being continuously forwarded in the data forwarding storage network can be sent to all users or specifically targeted according to one or more user characteristics, user profiles, usage patterns, history and/or past or present viewed page content. The advertisement being continuously forwarded in the data forwarding storage network can be displayed to a current user within an application or web browser or delivered to a wired or wireless radio, television and/or television network.

Advertisements can be retrieved in response to a stimulus or activity, such as the user's profile, traffic patterns of one or more users, application profiles, and so forth. Advertisements can be stored and delivered in any media form and either pre-configured by specific file type and size for a specific end user or site delivery requirements/formats, or delivered and formatted by virtue of the end user or middleware software compatibility systems.

In one example, selected advertisement can be delivered to a user through a web browser. More particularly, a plug-in and/or helper application can be associated with a user's web browser. In general, a plug-in is a computer program that interacts with a host application (a web browser or an email client, for example) to provide a certain, usually very specific, function "on demand." As a user navigates to a particular web page, the plug-in can parse displayed text. The plug-in can then request specific advertisement being continuously forwarded in the data forwarding storage network that matches the parsed text to the web browser of the user for display in a section of the display screen or as a pop-up.

In another example, a user requesting retrieval of a data file being continuously forwarded in the data forwarding storage network may be presented with specific advertisement being continuously forwarded in the data forwarding storage network that matches the user's profile. The user's profile may include various personal and/or demographic data that aids in directing appropriate advertisement to the user. The advertisement may then be displayed as a banner or in a shared window or in a separate window.

In each of the examples above, the network includes a group of interconnected computer system nodes each adapted to receive data and advertisement and continuously forward the data and advertisement from computer memory to computer memory, independent of each other, without storing on any physical storage device, in response to a request to store the data from a requesting system and retrieve data being continuously forwarded from computer memory to computer memory in response to a request to retrieve the data from the requesting system. Each node in the network is adapted to detect the presence of a data and advertisement in its memory and forward the data and advertisement to a computer memory of another node in the interconnected computer systems nodes according to a node's availability. The node's availability can be determined according to its volume of network traffic. Each node can encrypt the data.

A central node can be adapted to match the data retrieval request at a central server using a hash mark representing the data or advertisement entering a node, send a message to a node that is predicted to have the data or advertisement in memory, the message instructing the node to forward the data and/or advertisement in memory to the requester, and send a confirmation message to the central server that the data or advertisement in memory has been forwarded to the requester.

Figure 7:
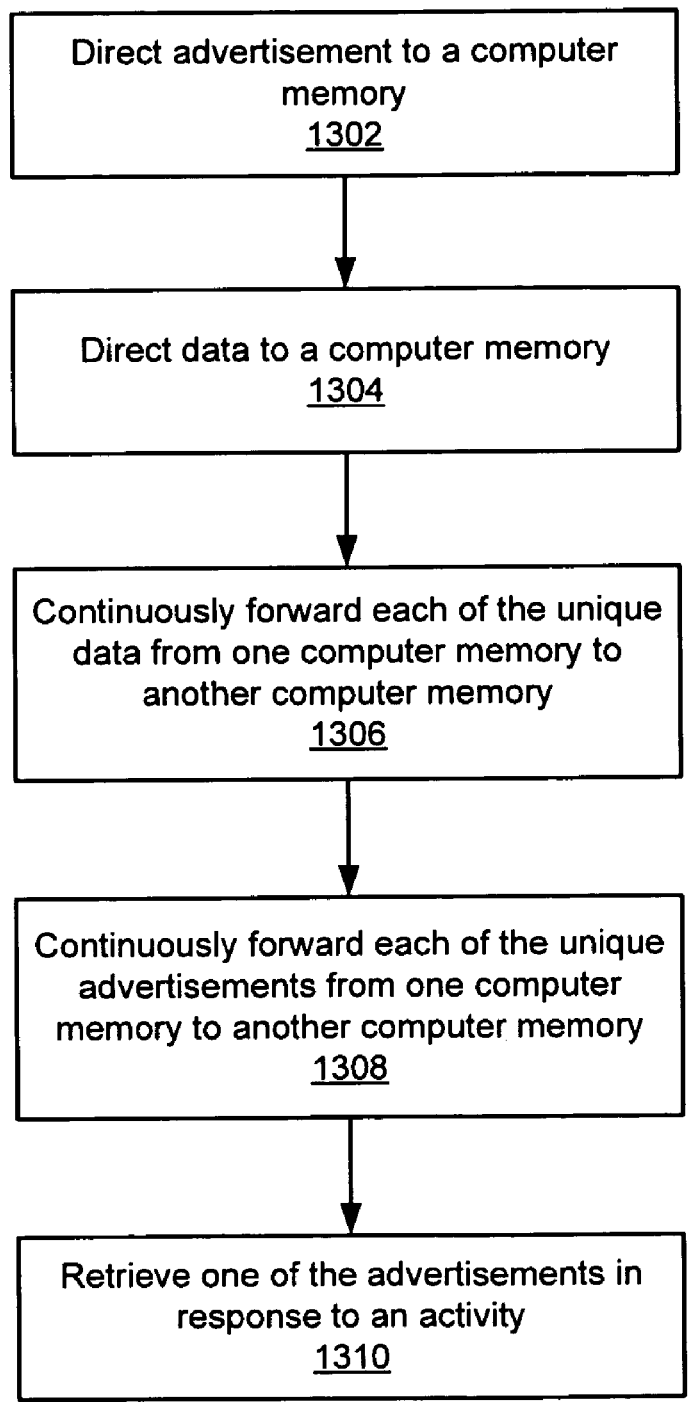
FIG. 7 is a flow diagram of a process.

As shown in FIG. 7, a process 1300 includes directing (1302) advertisement to a computer memory. The advertisement can include any content, including, but not limited to, text, audio, visual or any combination thereof. The advertisement can include multiple configurations in order to satisfy different systems delivery specifications. Advertisements can be stored and delivered in any media form and either pre-configured by specific file type and size for a specific end user or site delivery requirements/formats, or delivered and formatted by virtue of the end user or middleware software compatibility systems.

Process 1300 directs (1304) data to a computer memory.

Process 1300 continuously forwards (1306) each of the unique data, independent of each other, from one computer memory to another computer memory in the network of interconnected computer system nodes without storing on any physical storage device in the network.

Process 1300 continuously forwards (1308) each of the unique advertisements, independent of each other, from one computer memory to another computer memory in the network of interconnected computer system nodes without storing on any physical storage device in the network.

Process 1300 retrieves (1310) one of the advertisements in response to an activity.

Media Delivery

In one embodiment, cloud resource 24 may be used to support media delivery, discussed in more detail below.

The data storage and management system in which the data is never fixed in physical storage, but in fact, is continually being routed/forwarded from node memory to node memory in the network, can be used as a backend system(s) in many applications that currently used fixed medium storage. In one example, this data storage and management system where the data is continually being routed/forwarded from node memory to node memory in the network is used in a media delivery system. Here, we consider media to broadly include any predictable content, any archival content, any audio content, visual content, any text-based content, and so forth. Predictable content can be deployed into the data forwarding storage network and recalled/retrieved when needed, e.g., directed to an IP address of a specific user system.

The content can include text, audio, visual images, audiovisual images, or any combination thereof. For example, the network can continuously forward certain audiovisual highlights that are used each day, such as program introductions, graphic packages, introduction and theme music, historical footage of significance, commonly used reference footage, and so forth.

This content being continuously forwarded in the network may or may not be needed in the future. More specifically, content that is most likely needed but are seeded into the network according to the probability of use, not based upon the individual needs of a user to store a file. In addition to using probability of need as a storage priority, the network can use a more diverse distribution list for the stored content than the forward storage system utilized by a user for "normal file storage" because users are delivered material not by calling/requesting a file from the network itself, but by virtue of a content provider using the network as a distribution tool to their audience.

One such example is a stock quote system. In traditional stock quote systems used on the World Wide Web ("Web"), a user accesses a stock quote website through a graphical user interface (GUI) used for web browsing, such as Firefox®, Opera® or Flock®. One example stock quote website is Yahoo!® financial. The user enters a trading symbol of a stock in which he/she wants to query. The stock quote website receives the stock symbol, sends the stock symbol to a stock quote backend for a current price, receives the current price from the stock quote backend, and sends the current price to the user's GUI for viewing by the user. The current price is a numerical value, such as 17½, in this example.

Numeric values can be deployed into the data storage and management system and continually routed/forwarded from node memory to node memory in the network. A range of numeric values in appropriate increments can be deployed in the data storage and management system, similar to how data files are deployed when a message to store is received. Each of the numeric values is sent from a user system to the central server 14 using the data forwarding process 200, fully described above. This results in a large number of distinct and unique numeric values continually being routed/forwarded from node memory to node memory in the network.

When a user requests a current stock price from a web application like Yahoo! financial, Yahoo! financial requests from the backend stock quote server a current price and the central server 14 is informed of this price directly from the back end stock quote server. The central server 14 requests the numeric value representing the received price from the network and once found, directs the numeric value to the Internet Protocol (IP) address of the user requesting the quote.

In another stock quote example, a range of numeric values embedded in text can be deployed into the data storage and management system where the they are continually being routed/forwarded from node memory to node memory in the network. For example, "IBM is selling at 25," "IBM is selling at 25⅛," and forth, can be deployed. When a result for the current price of IBM is received, the financial web site requests from the backend stock quote server a current price and the central server 14 is informed of this price directly from the back end stock quote server. The central server 14 requests the numeric value representing the received price, along with associated text, from the network and once found, directs the numeric value with associated text to the Internet Protocol (IP) address of the user requesting the price. For example, if the current price of IBM sock is 25, the central server 14 requests that "IBM is selling at 25" be delivered to the user requesting the quote.

The above specific example used a range of unique numeric values in appropriate increments deployed in our data storage and management system. However, any predictable content, archival data and/or media data can be deployed in our data storage and management system. For example, election results can be deployed into our data storage and management system. More specifically, a news item reporting "Senator Obama won the general election" and that "Senator McCain won the general election" can be deployed to the network where they are never fixed in physical storage, but in fact, continually being routed/forwarded from node memory to node memory in the network.

When the election results are known in November 2008, a user can request election results. The web application makes a request to a news service requesting election results from a web application having a back end supported by our data storage and management system. The central server 14 is informed of election results by a news server. The central server 14 locates the news item in the network and directs the news story to the Internet Protocol (IP) address of the user requesting the news information.

In each of the examples above, the network includes a group of interconnected computer system nodes each adapted to receive data items and continuously forward the data items from computer memory to computer memory, independent of each other, without storing on any physical storage device, in response to a request to store the data items from a requesting system and retrieve a particular data item being continuously forwarded from computer memory to computer memory in response to a request to retrieve the data item from the requesting system. Each node in the network is adapted to detect the presence of a data item in its memory and forward the data item to a computer memory of another node in the interconnected computer systems nodes according to a node's availability. The node's availability can be determined according to its volume of network traffic. Each node can encrypt the data item.

A central node can be adapted to match the data retrieval request at a central server using a hash mark representing the data item entering a node, send a message to a node that is predicted to have the data item in memory, the message instructing the node to forward the data item in memory to the requester, and send a confirmation message to the central server that the data item in memory has been forwarded to the requester.

Real-Time Communications

Instant Messaging (IM) is a form of real-time communication between two or more people based on typed text. The text is conveyed using computers connected over a network such as the Internet. IM enables instantaneous communication between a number of parties simultaneously, by transmitting information quickly. Some IM systems enable users to use webcams and microphones for real-time conversations. In addition IM has additional features such as the immediate receipt of acknowledgment or reply, group chatting, conference services (including voice and video), conversation logging and file transfer. For example, it is possible to save a conversation for later reference. Instant messages are typically logged in a local message history that closes the gap to the persistent nature of E-mails and facilitates quick exchange of information like universal resource locators (URLs) or document snippets (which can be unwieldy when communicated via telephone).

In one embodiment, cloud resource 24 may be used to support one or more central servers 5016 in a framework 5010 for real-time communications (e.g., social networking applications such as instant messaging) in a continuously data forwarding network, as described further below.

Figure 17:
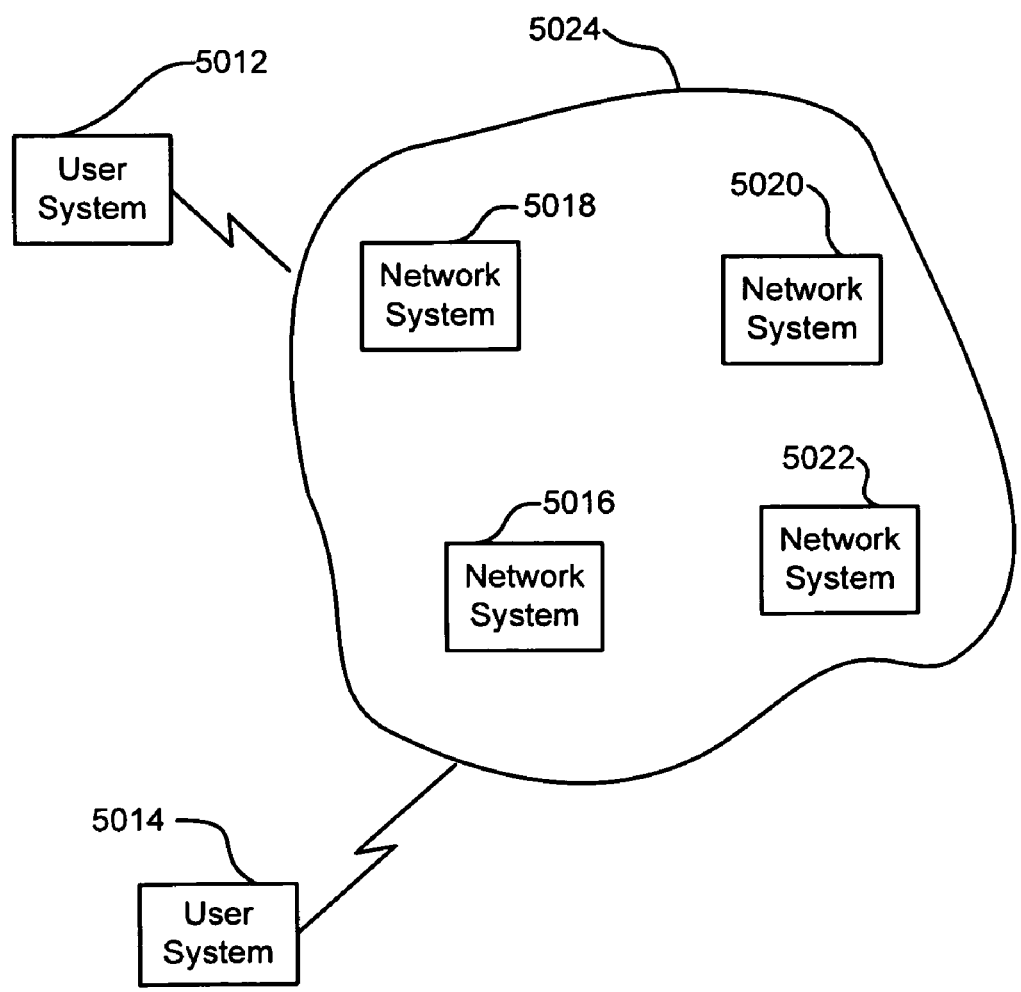
FIG. 17 is a block diagram of an exemplary framework.

As shown in FIG. 17, an exemplary continuously data forwarding framework 5010 includes two user systems 5012, 5014 (also referred to as client systems) coupled to a number of network systems 5016, 5018, 5020, 5022 (also referred to as servers). Each of the network systems 5016, 5018, 5020, 5022 is considered to be a node in a network 5024 and one such network system may be designated as a host or central server, such as network system 5016. As such, network system 5016 may assume a control position in network 5024. Each of the nodes 5016, 5018, 5020, 5022 can be established as a privately controlled network of peers under direct control of the central server 5016. Peered nodes can also be a mix of private and public nodes (e.g., the Internet), and thus not under the direct physical control of the central server 5016. The network 5024 can also be wholly public where the central server 5016 (or servers) has no direct ownership or direct physical control of any of the peered nodes.

The framework 5010 supports communications between computer users, such as users on user systems 5012, 5014. Computer users on user systems 5012, 5014 are distributed geographically and communicate using one or more of the network systems 5016, 5018, 5020, 5022 in network 5024. User systems 5012, 5014 are connected to network 5024 through various communication mediums.

Each of the user systems 5012, 5014 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. User systems 5012, 5014 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 5012, 5014. For instance, such communications programs may include E-mail programs, Instant Messaging (IM) programs, File Transfer Protocol (FTP) programs, Voice-over-Internet (VoIP) programs, as so forth. The instructions may be embodied permanently or temporarily in any type of machine, component, equipment, storage medium, or propagated signal that is capable of being delivered to the client systems 5012, 5014.

Clients systems 5012, 5014 include a communications interface (not shown) used by the communications programs to send communications through network 5024. The communications may include E-mail, audio data, video data, general binary data, or text data (e.g., encoded in American Standard Code for Information Interchange (ASCII) format).

The network 5024 can include a series of portals interconnected through a coherent system. Examples of the network 5024 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The network 5024 may include multiple networks or sub-networks, each of which may include, for example, a wired or wireless data pathway.

A host server 5016 may be connected to network 5024 and may be used to facilitate some direct or indirect communications between the client systems 5012, 5014. As with the client systems 5012, 5014, host server 5016 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 5016 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include E-mail programs, IM programs, FTP programs, VoIP programs, and so forth. The instructions may be embodied permanently or temporarily in any type of machine, component, equipment, storage medium, or propagated signal that is capable of being delivered to the host server 16.

Further, host server 5016 includes a communications interface (not shown) used by the communications programs to send communications through network 5024. The communications may include E-mail, audio data, video data, general binary data, or text data (e.g., encoded in American Standard Code for Information Interchange (ASCII) format).

The user systems 5012, 5014 can execute an instant messaging (IM) client program. IM programs typically enable users to communicate in real-time with each other in a variety of ways. Most IM programs provide, for example:

(1) Instant messages—send notes back and forth with a friend who is online (2) Chat—create a chat room with friends or co-workers (3) Web links—share links to your favorite Web sites (4) Video—send and view videos, and chat face to face with friends (5) Images—look at an image stored on your friend's computer (6) Sounds—play sounds for your friends (7) Files—share files by sending them directly to your friends (8) Talk—use the Internet instead of a phone to actually talk with friends (9) Streaming content—real-time or near-real-time stock quotes and news

(10) Mobile capabilities—send instant messages from your cell phone

Examples of IM communications include those provided by AIM (America Online® Instant Messenger), Yahoo® Messenger, MSN® Messenger, and ICQ®, and so forth.

The framework 5010 supports these IM communications and enables users to store video, images, sounds, files and other content, which can be included in IM communications. When a request to store data is received by the central server 5016 from one of the user systems 5012, 5014, data is directed to a node in the network 5024 where it is then continuously forwarded from node memory to node memory in the network 5024 without storing on any physical storage medium such as a disk drive.

In a like manner, when a request to retrieve data is received by the central server 5016 from a user system 5012, 5014, the requested data, which is being forwarded from node memory to node memory in the network 5024, is retrieved.

Figure 18:
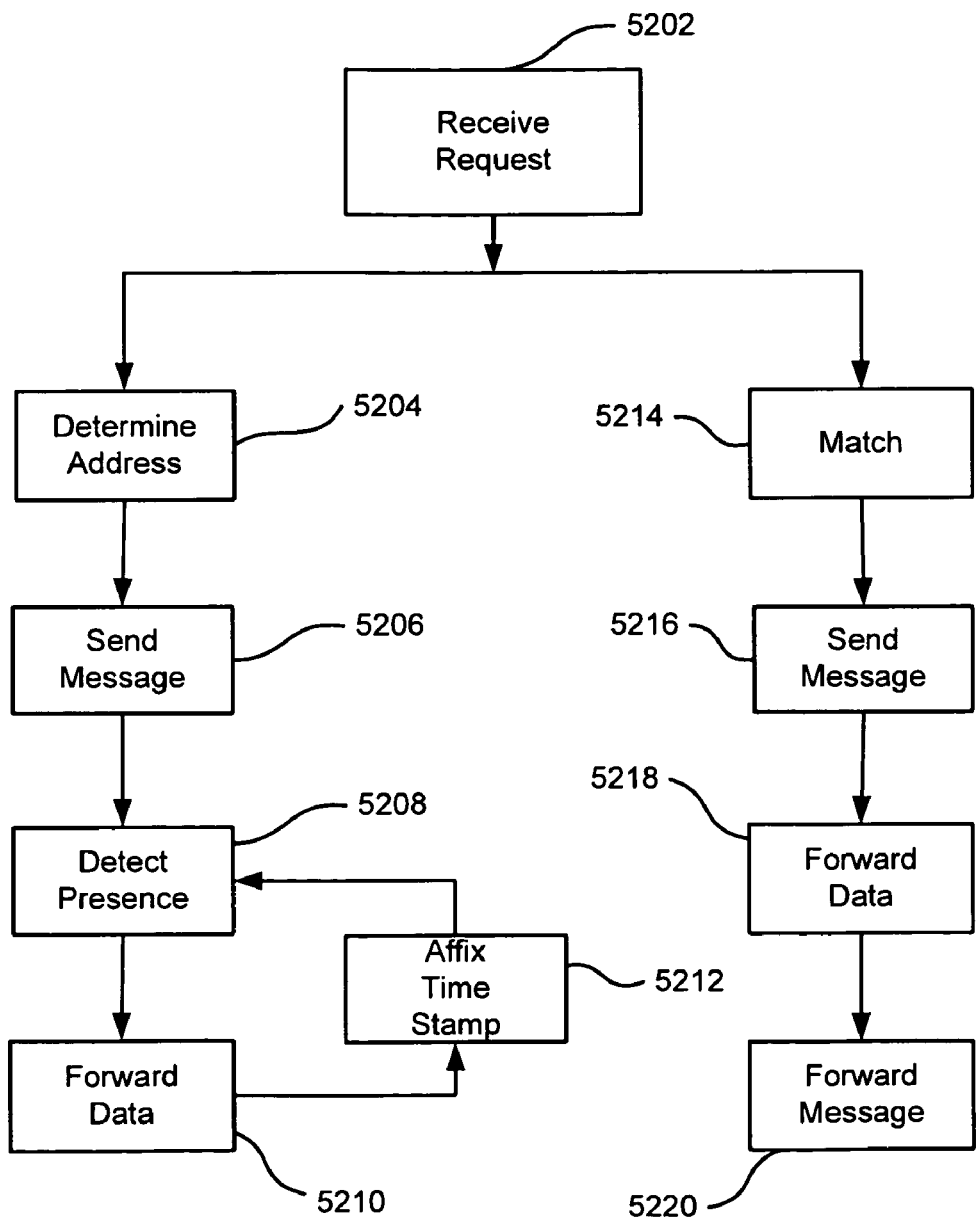
FIG. 18 is a flow diagram.

FIG. 18 illustrates a process 5200 that resides on each of the network nodes 5016, 5018, 5020, 5022 that facilitates data forwarding. Process 5200 includes receiving (5202) a request from a user system to store or retrieve data. If the received request is a request to store data, process 5200 determines (5204) an address of a node available to receive the data in memory. This determination (5204) can include pinging the network and determining which of the nodes in a network is available, or determining which node in the network has the least traffic, or determining which node in the network has the largest available memory, or any combination of these or other factors.

Process 5200 sends (5206) a message to the user system with the address of a specific node for the requester to forward the data.

Process 5200 detects (5208) the presence of data in node memory. Process 5200 forwards (5210) the data in memory to another node in the network of nodes and continues to repeat detecting (5208) and forwarding (5210) of the data from node memory to node memory. When data arrives in any node memory, process 5200 affixes (5212) a time stamp to the data. Additionally, as data enters and exits any mode memory, the data may be encrypted and de-encrypted.

Forwarding (5210) can include pinging the node in the network to determine which of the nodes in the network is available, or determining which node in the network has the least traffic, or determining which node in the network has the largest available memory, or any combination of these or other factors.

If the received request is a request to retrieve data being continuously forwarded from node memory to node memory, process 5200 matches (5214) at the central server 5016 using a hash mark or other unique code that can be "sniffed" by the node upon the data entering the node via the encryption handshake. This can occur by pinging the nodes in the network. Process 5200 sends (5216) the message to return the data to the user directly to the node or node state where the central server 5016 believes the data will likely appear. The more the central server 5016 can narrow the node state that it pings to, then the more efficient the retrieval will become and the less burdened by unnecessary messaging traffic to nodes that are not necessary for a transaction between the central server 16 and the node capable of forwarding the data.

Once the correct node receives the message to forward the data in node memory to the requester, process 5200 forwards (5218) the data in node memory to the requester and forwards (5220) a confirmation message that the data has been sent to the user. This routing message may be sent directly to the central server 5016 or may be passed to the central server 5016 or servers via other node(s) or supernode(s) in the network 5024. Upon the user receiving the requested data the user's application functions to automatically ping the central server 5016 that the data requested has been received. Thus the network 5024 creates data storage without caching, downloading and/or storing the data on any physical storage medium. Data storage and management is accomplished via a continuously routing of the data from node memory to node memory.

Figure 19:
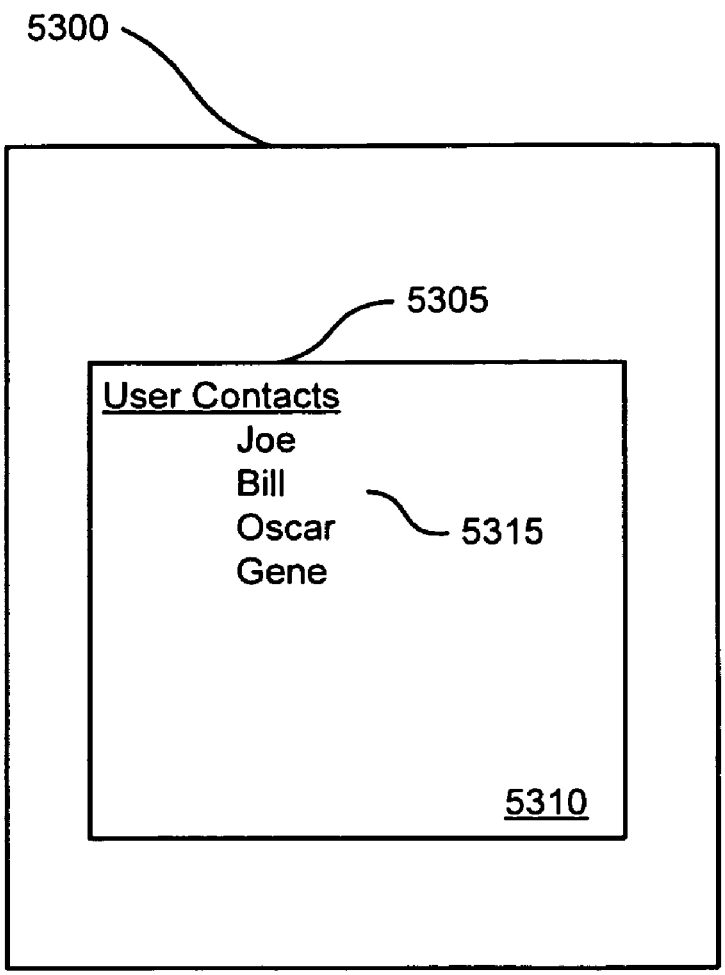
FIG. 19 is an exemplary instant messaging user interface.

FIG. 19 illustrates an example interface presented to a user of one of the client systems 5012, 5014 when running an instant messaging client program. As described above, instant messaging programs typically enable users to communicate in real-time with each other in a variety of ways. For example, many instant messaging programs enable users to send text as an instant message, to transfer files, and to communicate by voice.

Shown is a desktop 5300 with a user interface 5305 of the instant messaging client program. User interface 5305 has a text box 5310 that displays representations 5315 of the program user's contacts or buddies (both terms are used interchangeably herein), which are other users of an instant messaging program with whom the program user desires to communicate and interact. The representations 5315 may provide contextual information to the program user about the buddy, such as whether the contact is online, how long the contact has been online, whether the contact is away, or whether the contact is using a mobile device.

The list of contacts displayed in text box 5310 of user interface 5305 typically is referred to as the contact list or buddy list. The IM program user can typically add or remove contacts from the contact list. In the example shown, the representations 5315 are text icons showing the screen names of the contacts.

Instant messaging programs may use an instant messaging server to assist in communications between users of the instant messaging program. The instant messaging server may be implemented, for example, using host server 5016. When a user is connected to the network and executes the instant messaging program, the instant messaging program contacts the host server 5016 and logs the user onto the host server 5016. The host server 5016 informs the instant messaging program when the program user's contacts are online and facilitates communications between the program user and an online contact.

The host server 5016 may support IM services irrespective of a program user's network or Internet access. Thus, host server 5016 may enable users to send and receive IMs, regardless of whether they have access to any particular Internet service provider (ISP). The host server 5016 also may support associated services, such as administrative matters, advertising, directory services, chat, and interest groups related to IM. To transfer data, the host server 5016 employs one or more IM protocols.

To begin an IM session, the IM client program running on a client system 5012, 5014 establishes a connection with the host server 5016 and logs onto the host server 5016. Once a session is established, a user can use the IM client program to view whether particular buddies are online, exchange IMs with particular buddies, participate in group chat rooms, trade files such as pictures, invitations or documents. The IM program user also may be able to find other buddies with similar interests, get customized information such as news and stock quotes, and search the World Wide Web.

Host server 5016 may assist IM communications between users of IM client programs by facilitating the establishment of a peer-to-peer communication session between the IM client programs. Or the host server 5016 may assist IM communications by directly routing communications between the IM client programs.

When a contact is online, the IM program user can communicate or interact with the contact in a number of ways. For instance, the IM program user can send an instant message to the contact (typically in the form of text).

Sending a message opens up a window in which messages can be typed back-and-forth between the IM program user and the contact. Similarly, the IM program user also can send a file or other content to the contact.

To initiate these actions for a contact, the IM program user performs operations on the representation of the contact displayed in user interface 5305. The program then executes the corresponding action in response to the operation performed on the representation. For example, an instant message might be initiated by double-clicking on a contact's representation. Or, a file transfer might be initiated by the IM program user selecting the contact's representation to bring up a context menu and choosing "send a file" from the menu.

Other actions can be executed in response to operations performed on the representation of the contact displayed in interface 5305. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 5305 may have icons 5330 to help a user set various options or perform operations in the instant messaging program.

While the techniques have been described primarily with IM applications, they may be applied to other communications programs such as FTP programs, e-mail programs, voice-over-IP (VoIP) or other telephony programs, or players for streaming media.

Closing

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:

in a network of interconnected computer system nodes comprising at least one central server, wherein the at least one central server is configured to communicate with a cloud resource, receiving a request from a source system to store at least one data item;

directing the at least one data item to a node;

in response to the request from the source system, continuously forwarding the at least one data item among the nodes in the network of interconnected computer system nodes without storing the forwarded at least one data item on any fixed storage medium in the network, the forwarded at least one data item being constantly routed within the network from node to node, and each of the forwarded at least one data item being available for retrieval if a request to retrieve the data is received; and supporting, under control of the at least one central server, one or more functions of the network of interconnected computer system nodes using the cloud resource.

2. The method of claim 1 wherein the continuously forwarding comprises:

determining an address of a node available to receive the at least one data item based on one or more factors;

sending a message to the source system with the address of a specific node for the source system to forward the at least one data item;

detecting a presence of the at least one data item at the specific node; and forwarding the at least one data item to another node in the network of interconnected computer system nodes without storing the forwarded at least one data item on any fixed storage medium.

3. The method of claim 2 wherein the one or more factors comprise network traffic analysis and available memory.

4. The method of claim 2 further comprising:
receiving a request from the source system to retrieve the at least one data item being continuously forwarded in the network of interconnected computer system nodes; and
retrieving the at least one data item from a node in response to the request to retrieve the at least one data item.

5. The method of claim 1 wherein the supporting of the network of interconnected computer system nodes comprises off-loading of at least one computational function and/or at least one data storage function from the network to the cloud resource.

6. The method of claim 5 wherein the at least one data storage function comprises storing administration information, related to system management of at least a portion of the data continuously forwarded in the network of interconnected computer system nodes, on the cloud resource.

7. The method of claim 6 further comprising:
selecting a plurality of data items to store for future delivery to a plurality of users based on anticipated user demand, wherein the administration information is related to the plurality of data items, and each of the plurality of data items comprises any of text, audio, visual images, audiovisual images, or any combination thereof;
storing the plurality of data items on the cloud resource under control of the at least one central server; and
retrieving at least one of the plurality of data items in response to a request from one or more source systems coupled to the network of interconnected computer system nodes.

8. The method of claim 1 wherein:
the cloud resource comprises at least one multi-homed node; and
the at least one central server controls data storage on the at least one multi-homed node.

9. The method of claim 1 wherein:
the directing the at least one data item to a node comprises directing the at least one data item to a memory location associated with a first non-loopback network address available to receive the at least one data item; and
the continuously forwarding further comprises:
continuously forwarding the at least one data item from the memory location associated with the first non-loopback network address to a memory location associated with another non-loopback network address;
detecting a presence of the at least one data item in a memory location associated with a specific non-loopback network address; and
forwarding the at least one data item to another memory location of the another non-loopback network address without storing the forwarded at least one data item on any fixed storage medium.

10. The method of claim 1 further comprising:
directing a plurality of advertisements to a node;
storing the plurality of advertisements on the cloud resource under control of the at least one central server; and
retrieving one of the advertisements in response to an activity.

11. The method of claim 1 further comprising directing, under control of the at least one central server, a copy of the at least one data item to the cloud resource.

12. The method of claim 11 further comprising continuously forwarding the copy of the at least one data item from one node to another node in the cloud resource without storing the copy of the forwarded at least one data item on any fixed storage medium in the cloud resource.

13. The method of claim 1 further comprising:
receiving a request from a source system in the network to store a data file;
saving a file name of the data file in an index file associated with the at least one central server; and
storing the index file on the cloud resource.

14. The method of claim 13 further comprising:
scrambling a copy of the data file; and
saving the copied scrambled data file in a database of scrambled data files on the cloud resource.

15. The method of claim 13 further comprising:
receiving a request from a source system coupled to the network of interconnected computer system nodes to delete the data file, the request including the file name;
searching the index file on the cloud resource for the file name;
removing the file name from the index file;
locating the data file represented by the file name; and
deleting the data file.

16. The method of claim 15 wherein deleting the data file comprises directing the located data file to a node in the network of interconnected computer system nodes that does not forward or store data files.

17. The method of claim 1 further comprising:
receiving a request from a first user system linked to the network of interconnected computer system nodes to retrieve data stored on the cloud resource, the first user system executing a real-time communications client program that establishes a real-time communications session with a second user system executing a real-time communications client program;
retrieving the data under control of the at least one central server in response to the request from the first user system to retrieve data; and
forwarding the retrieved data to the second user system.

18. The method of claim 1 wherein the at least one central server acts as a middleware between the cloud resource and the network of interconnected computer system nodes.

19. A computer program product, tangibly embodied in computer readable medium, for storing and retrieving data in a network of interconnected computer system nodes comprising at least one central server, wherein the at least one central server is configured to communicate with a cloud resource, the computer program product causing data processing apparatus to:
receive a request from a source system to store at least one data item;
direct the at least one data item to a node;
in response to the request from the source system, continuously forward the at least one data item among the nodes in the network of interconnected computer system nodes without storing the forwarded at least one data item on any fixed storage medium in the network, the forwarded at least one data item being constantly routed within the network from node to node, and the forwarded at least one data item being available for retrieval if a request to retrieve the data is received; and
support, under control of the at least one central server, one or more functions of the network of interconnected computer system nodes using the cloud resource.

20. A network comprising a group of interconnected computer system nodes, the group comprising at least one central server, wherein:
the at least one central server is configured to communicate with a cloud resource and to control support by the cloud resource of one or more functions of the group of interconnected computer system nodes; and each node of the group of interconnected computer system nodes is configured to, in response to a request from a requesting system to store at least one data item, receive the at least one data item and continuously forward the at least one data item among the nodes without storing the forwarded at least one data item on any fixed storage medium, the forwarded at least one data item being constantly routed within the network from node to node, and to, in response to a request from the requesting system to retrieve the at least one data item, retrieve the at least one data item being continuously forwarded among the nodes.

* * * * *